US008527276B1

(12) United States Patent  (10) Patent No.: US 8,527,276 B1
Senior et al.  (45) Date of Patent: Sep. 3, 2013

(54) SPEECH SYNTHESIS USING DEEP NEURAL NETWORKS

(71) Applicants: Andrew William Senior, New York City, NY (US); Byungha Chun, Surrey (GB); Michael Schuster, Saratoga, CA (US)

(72) Inventors: Andrew William Senior, New York City, NY (US); Byungha Chun, Surrey (GB); Michael Schuster, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/660,722

(22) Filed: Oct. 25, 2012

(51) Int. Cl.
*G10L 13/00* (2006.01)

(52) U.S. Cl.
USPC .......................................... 704/259; 704/258

(58) Field of Classification Search
USPC .................................................. 704/258–268
See application file for complete search history.

(56) References Cited

U.S. PATENT DOCUMENTS

| | | | | | |
|---|---|---|---|---|---|
| 5,668,926 | A | * | 9/1997 | Karaali et al. | 704/232 |
| 5,913,194 | A | * | 6/1999 | Karaali et al. | 704/259 |
| 6,178,402 | B1 | * | 1/2001 | Corrigan | 704/259 |
| 7,444,282 | B2 | * | 10/2008 | Choo et al. | 704/202 |
| 8,024,193 | B2 | * | 9/2011 | Bellegarda | 704/269 |
| 8,126,717 | B1 | * | 2/2012 | Strom | 704/260 |
| 2008/0091428 | A1 | * | 4/2008 | Bellegarda | 704/254 |

OTHER PUBLICATIONS

Tokuda, K., Zen, H., Black, A., "An HMM-based speech synthesis system applied to English," 2002, in: Proc. IEEE Speech Synthesis Workshop, from http://www.cse.lehigh.edu/prr/Biometrics/Archive/Papers/tokuda_TTSworkshop2002.pdf.

Tokuda, K., Yoshimura, T., Masuko, T., Kobayashi, T., Kitamura, T., "Speech parameter generation algorithms for HMM-based speech synthesis," 2000,in: Proceedings 2000 IEEE International Conference on Acoustics, Speech, and Signal Processing pp. 1315-1318.

Yoshimura, T., Tokuda, K., Masuko, T., Kobayashi, T., Kitamura, T., "Simultaneous modeling of spectrum, pitch and duration in HMM-based speech synthesis," 1999, in: Proceedings Sixth European Conference on Speech Communication and Technology, Eurospeech 1999, Budapest, Hungary, Sep. 5-9, 1999 pp. 2347-2350, from http://www.sp.nitech.ac.jp/~tokuda/selected_pub/pdf/conference/yoshimura_eurospeech1999.pdf.

David Frontini and Mario Malcangi "Neural Network-based Speech Synthesis," paper presented at DSP Application Day 2006, Milano—Sep. 18, 2006, from http://www.dsp-rts.di.unimi.it/Eventi-DSP_App_Day_2006_file/Frontini/Frontini1.pdf.

(Continued)

*Primary Examiner* — Douglas Godbold
(74) *Attorney, Agent, or Firm* — McDonnell Boehnen Hulbert & Berghoff LLP

(57) ABSTRACT

A method and system for is disclosed for speech synthesis using deep neural networks. A neural network may be trained to map input phonetic transcriptions of training-time text strings into sequences of acoustic feature vectors, which yield predefined speech waveforms when processed by a signal generation module. The training-time text strings may correspond to written transcriptions of speech carried in the predefined speech waveforms. Subsequent to training, a run-time text string may be translated to a run-time phonetic transcription, which may include a run-time sequence of phonetic-context descriptors, each of which contains a phonetic speech unit, data indicating phonetic context, and data indicating time duration of the respective phonetic speech unit. The trained neural network may then map the run-time sequence of the phonetic-context descriptors to run-time predicted feature vectors, which may in turn be translated into synthesized speech by the signal generation module.

26 Claims, 8 Drawing Sheets

(56) References Cited

OTHER PUBLICATIONS

Orhan Karaali, Gerald Corrigan, and Ira Gerson, "Speech Synthesis with Neural Networks," In Proceedings of World Congress on Neural Networks, San Diego, Sep. 1996, pp. 45-50, from citeseerx.ist.psu.edu/viewdoc/download?doi=10.1.1.30.7134&rep=rep1&type=pdf.

E. Veera Raghavendra, P. Vijayaditya and Kishore Prahallad, "Speech Synthesis Using Artificial Neural Networks," in Proceedings of National Conference on Communications 2010, Chennai, India, Jan. 2010, pp. 261-265, from http://ravi.iiit.ac.in/~speech/publications/N3.pdf.

Yi-Jian Wu, Keiichi Tokuda, "Minimum generation error training with direct log spectral distortion on LSPs for HMM-based speech synthesis," In proceedings Interspeech 2008, 9th Annual Conference of the International Speech Communication Association, Brisbane, Australia, Sep. 22-26, 2008, pp. 577-580, from http://www.sp.nitech.ac.jp/~bonanza/Paper/EMIME/yjwu_interspeech2008.pdf.

Turek, C., and Robinson, T., "Speech Synthesis Using Artificial Neural Networks Trained on Cepstral Coefficients," in Proceedings of the 3rd European Conference on Speech Communication Technology, 1993, vol. 3, Berlin, Germany, pp. 1713-1716.

* cited by examiner

SPEECH SYNTHESIS USING DEEP NEURAL NETWORKS

BACKGROUND

Unless otherwise indicated herein, the materials described in this section are not prior art to the claims in this application and are not admitted to be prior art by inclusion in this section.

A goal of speech synthesis technology is to convert written language into speech that can be output in an audio format, for example directly or stored as an audio file suitable for audio output. The written language could take the form of text, or symbolic linguistic representations. The speech may be generated as a waveform by a speech synthesizer, which produces articifical human speech. Natural sounding human speech may also be a goal of a speech synthesis system. Various technologies, including computers, network servers, telephones, and personal digital assistants (PDAs), can be employed to implement speech synthesis system, or one or more components of such a system. Communication networks may in turn provide communication paths and links between some or all of such devices, supporting speech synthesis system capabilities and services that may utilize speech synthesis system capabilities.

BRIEF SUMMARY

In one aspect, an example embodiment presented herein provides, a method comprising: training a neural network implemented by one or more processors of a system to map one or more training-time sequences of phonetic-context descriptors received by the neural network into training-time predicted feature vectors that correspond to acoustic properties of predefined speech waveforms, wherein the one or more training-time sequences of phonetic-context descriptors correspond to phonetic transcriptions of training-time text strings, and the training-time text strings correspond to written transcriptions of speech carried in the predefined speech waveforms; receiving, by a text analysis module implemented by the one or more processors, a run-time text string; processing the received run-time text string with the text analysis module to generate a run-time sequence of phonetic-context descriptors that corresponds to a phonetic transcription of the run-time text string, wherein each phonetic-context descriptor of the run-time sequence includes a respective label identifying a phonetic speech unit of a plurality of phonetic speech units, data indicating phonetic context of the identified phonetic speech unit, and data indicating time duration of the identified phonetic speech unit; processing the run-time sequence of the phonetic-context descriptors with the trained neural network to generate one or more run-time predicted feature vectors; and processing the one or more run-time predicted feature vectors with a signal generation module to produce and output a run-time speech waveform corresponding to a spoken rendering of the received run-time text string.

In another aspect, an example embodiment presented herein provides, a system comprising: one or more processors; memory; and machine-readable instructions stored in the memory, that upon execution by the one or more processors cause the system to carry out operations comprising: training a neural network implemented by the system to map one or more training-time sequences of phonetic-context descriptors received by the neural network into training-time predicted feature vectors that correspond to acoustic properties of predefined speech waveforms, wherein the one or more training-time sequences of phonetic-context descriptors correspond to phonetic transcriptions of training-time text strings, and the training-time text strings correspond to written transcriptions of speech carried in the predefined speech waveforms; receiving, by a text analysis module implemented by the system, a run-time text string, processing the received run-time text string with the text analysis module to generate a run-time sequence of phonetic-context descriptors that corresponds to a phonetic transcription of the run-time text string, wherein each phonetic-context descriptor of the run-time sequence includes a respective label identifying a phonetic speech unit of a plurality of phonetic speech units, data indicating phonetic context of the identified phonetic speech unit, and data indicating time duration of the identified phonetic speech unit, processing the run-time sequence of the phonetic-context descriptors with the trained neural network to generate one or more run-time predicted feature vectors, and processing the one or more run-time predicted feature vectors with a signal generation module to produce and output a run-time speech waveform corresponding to a spoken rendering of the received run-time text string.

In still another aspect, an article of manufacture including a computer-readable storage medium, having stored thereon program instructions that, upon execution by one or more processors of a system, cause the system to perform operations comprising: training a neural network implemented by the system to map one or more training-time sequences of phonetic-context descriptors received by the neural network into training-time predicted feature vectors that correspond to acoustic properties of predefined speech waveforms, wherein the one or more training-time sequences of phonetic-context descriptors correspond to phonetic transcriptions of training-time text strings, and the training-time text strings correspond to written transcriptions of speech carried in the predefined speech waveforms; receiving, by a text analysis module implemented by the system, a run-time text string; processing the received run-time text string with the text analysis module to generate a run-time sequence of phonetic-context descriptors that corresponds to a phonetic transcription of the run-time text string, wherein each phonetic-context descriptor of the run-time sequence includes a respective label identifying a phonetic speech unit of a plurality of phonetic speech units, data indicating phonetic context of the identified phonetic speech unit, and data indicating time duration of the identified phonetic speech unit; processing the run-time sequence of the phonetic-context descriptors with the trained neural network to generate one or more run-time predicted feature vectors; and processing the one or more run-time predicted feature vectors with a signal generation module to produce and output a run-time speech waveform corresponding to a spoken rendering of the received run-time text string.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
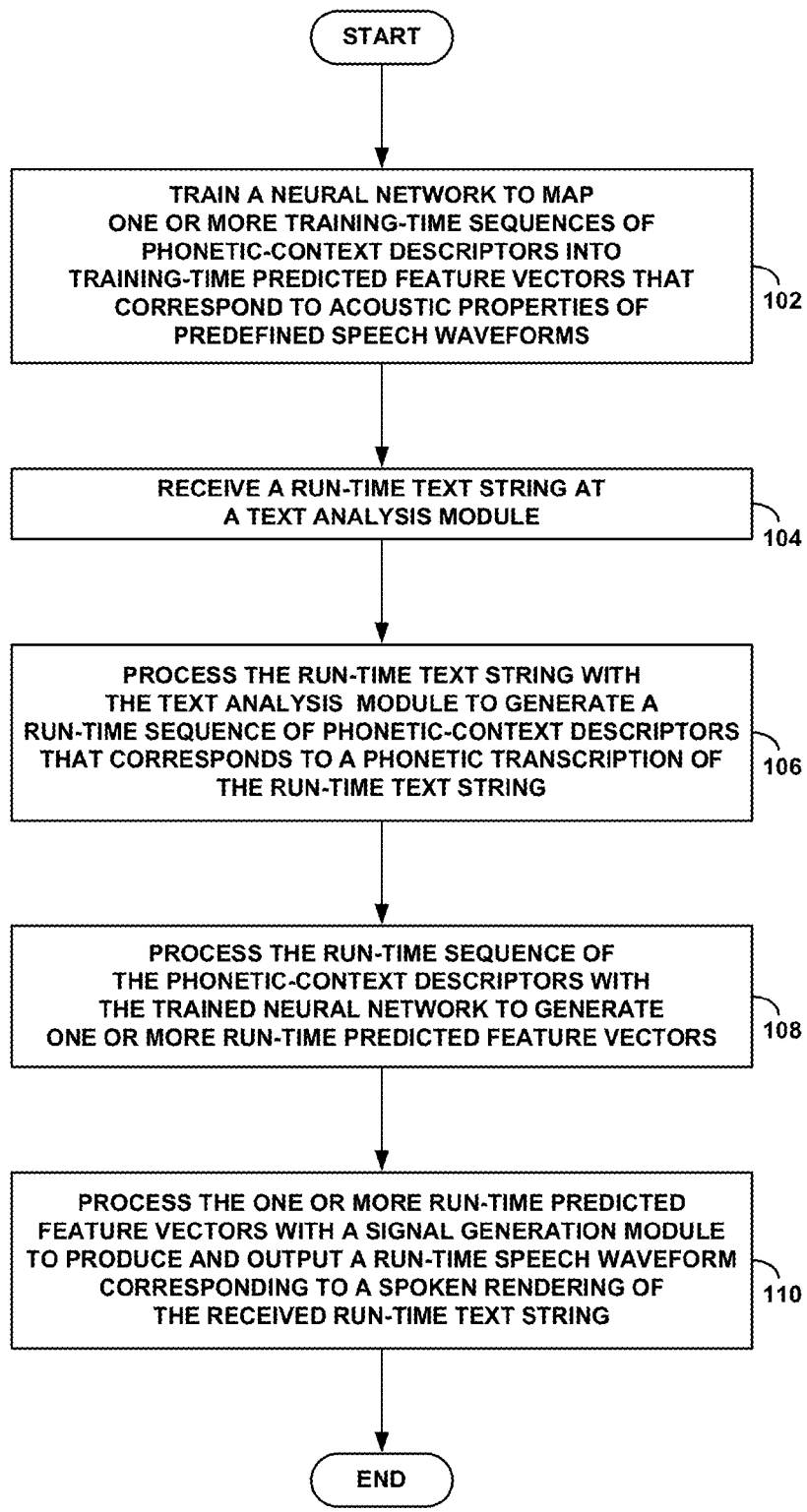
FIG. 1 is a flowchart illustrating an example method in accordance with an example embodiment.

A speech synthesis system can be a processor-based system configured to convert written language into artificially produced speech or spoken language. The written language could be written text, such as one or more written sentences or text strings, for example. The written language could also take the form of other symbolic representations, such as a speech synthesis mark-up language, which may include information indicative of speaker emotion, speaker gender, speaker identification, as well as speaking styles. The source of the written text could be input from a keyboard or keypad of a computing device, such as a portable computing device (e.g., a PDA, smartphone, etc.), or could be from file stored on one or another form of computer readable storage medium. The artificially produced speech could be generated as a waveform from a signal generation device or module (e.g., a speech synthesizer device), and output by an audio playout device and/or formatted and recorded as an audio file on a tangible recording medium. Such a system may also be referred to as a "text-to-speech" (TTS) system, although the written form may not necessarily be limited to only text.

A speech synthesis system may operate by receiving an input text string (or other form of written language), and translating the written text into a phonetic transcription corresponding to a symbolic representation of how the spoken rendering of the text sounds or should sound. The phonetic transcription may then be mapped to acoustic features that quantify an acoustic rendering of the phonetic transcription, and which then serve as input to a signal generation module device or element that can produce an audio waveform suitable for playout by an audio output device. The playout may sound like a human voice speaking the words (or sounds) of the input text string, for example. In the context of speech synthesis, the more natural the sound (e.g., to the human ear) of the synthesized voice, generally the better the voice quality. The audio waveform could also be generated as an audio file that may be stored or recorded on storage media suitable for subsequent playout. The acoustic features may also be represented a data quantities that may be stored for later processing by a signal generation module, or to serve as inputs to alternative processing steps.

The phonetic transcription of the input text string could take the form of a sequence of phonetic labels, each identifying a respective phonetic speech unit. A phonetic speech unit may correspond to an acoustic representation of a segment of speech. Each phonetic label of the sequence could also be accompanied by contextual information that indicates proper and/or intended speech rendering of the "identified phonetic speech unit." For purposes of the discussion herein, the term "identified phonetic speech unit" or the like shall be used to refer to a phonetic speech unit associated with (i.e., identified by) a phonetic label.

By way of example, phonetic speech units could be phonemes. As will be appreciated, phonemes are speech segments that generally correspond to the smallest units of speech that are distinguishable from each other. There are, for example, approximately 40-50 phonemes in spoken English. Spoken words (or other segments of speech) can be constructed from appropriate sequences of subsets of these phonemes. Hence, a sequence of phoneme labels may be used to represent a corresponding sequence of phonemes from which speech may be constructed.

Contextual information could include relative positions of identified phonemes within an input sequence. For example, a label that precedes a given phoneme label in a sequence may indicate a phoneme that should precede a given phoneme identified by the given label; similarly, a label that follows the given phoneme label may indicate a phoneme that should follow the given phoneme. By convention, the position preceding a given phoneme is called the "left context" and the position following the given phoneme is called the "right context." This corresponds to the direction in which English is read. In keeping with conventional terminology, right and left context phonemes may be respectively identified by right and left context phoneme labels. Furthermore, phoneme context may extend to more than one right context phoneme (and more than one right context phoneme label), and/or more than one left context phoneme (and more than one left context phoneme label); and the number of right context phonemes (and associated labels) need not equal the number of left context phonemes (and associated labels).

Contextual information could also include timing information to indicate intended durations of acoustic renderings of identified phonemes, and intended relative timing positions of phonemes within more extended waveforms. Context information could also include state information to indicate acoustic phases of phonemes. It has been observed empirically, for example, that phonemes manifest in speech across three acoustic phases: a start, a middle, and an end. Thus, in synthesizing speech from a sequence of phoneme labels, timing information could indicate durations of acoustic phases of identified phonemes, as well as entire durations of identified phonemes. Other context information could include acoustic properties associated with physical characteristics of speech sounds and production, such as nasal, fricative, vowel, and vocal tract length. In addition, language and syntax rules may provide linguistic context and or identification of parts of speech (e.g., vowel, consonant, etc.).

For the purposes of the discussion herein, the term "phonetic-context descriptor" shall be used to refer to a construct made up of each given phonetic label (e.g., a phoneme label) in a sequence corresponding to a phonetic transcription, together with context information associated with the identified phonetic speech unit (e.g., right and/or left context phonetic labels, timing and acoustic phase information, etc.). Thus, a phonetic transcription may be considered a sequence of phonetic-context descriptors, and each phonetic-context descriptor in the sequence may include information that indicates how the identified phonetic speech unit should be rendered in a speech waveform or other output format.

Acoustic features could take the form of feature vectors, which include quantifiable properties of speech waveforms, such as frequencies and spectral powers, for example. The acoustic properties represented in feature vectors can be transformed to physical properties by a signal generation device (e.g., speech synthesizer module) in order to generate waveforms corresponding to speech.

At a high-level, the architecture of a speech synthesis system may include a text analysis module, an acoustic parameter generation module, a speech database, and a signal generation module (among other possible modules and/or components). The text analysis module may function to generate phonetic transcriptions of input text strings, for example as one or more sequences of phonetic-context descriptors. The acoustic parameter generation module may function to map phonetic transcriptions into acoustic feature vectors. The signal generation module may be part of a speech synthesizer, which generates speech waveforms from input acoustic feature vectors. For example, the acoustic feature vectors could correspond to encoded speech, and the signal generation module could include a vocoder for translating encoded speech into a speech waveform. Additionally or alternatively, acoustic feature vectors may be stored for later synthesis by a signal generation module, or for other forms of processing.

The speech database could include a "corpus" or body of recorded speech and associated text, labels, and/or feature vectors. The recorded speech could include speech units as small as phonemes and/or as large as, or larger than, sentences. As part of the speech synthesis system, the speech database could be used to train the parameter generation module, for example.

The ability of a speech synthesis system to synthesize speech with good voice quality depends, at least in part, on generation or prediction of acoustic feature vectors that accurately model the phonetic transcription of the input text. More particularly, the more accurately the parameter generation module maps sequences of phonetic-context descriptors into feature vectors, the better the voice quality of the synthesized speech. Since each phonetic-context descriptor includes an associated phoneme (or other phonetic speech unit) and context information, the process of mapping involves accounting for context. In turn, context information can be used to help enhance the accuracy of the predicted feature vectors.

In practice, the number and variety of contexts that can occur can be very large. For example, taking the number of phonemes in the English language to be 40 (the exact number may vary depending on specific phoneme definitions, for example), and considering just one right context phoneme and one left context phoneme for each of the 40 phonemes, there can be approximately $40^3=64,000$ combinations of phoneme labels. Considering three acoustic phases per triplet of phonemes associated with the 64,000 phoneme labels, there can be 192,000 "context-dependent" states. The number is even larger if additional left and right context phoneme labels are considered. Adding to this, duration (timing) information for the phonemes associated with each triplet of labels, and physical characteristics of speech sounds, both of which can depend on instance-specific language context, the parameter generation module may need to consider a very large number of contexts as part of the mapping process.

Conventional approaches to mapping phonetic transcriptions (e.g., phonetic-context descriptors) to predicted feature vectors in the face of the large number of contexts may use techniques that incorporate some combination of context clustering, decision tree searching, and statistical modeling, such as hidden Markov models (HMMs). While these techniques can be effective in helping to keep the computational challenges tractable, they can also introduce a degree of approximation that may not yield accurate and/or optimal results in all instances. Accordingly, there is a need for computational techniques that can accurately map context-intensive phonetic transcriptions of text, such as sequences of phonetic-context descriptors that include significant context information, to predicted feature vectors that yield high voice quality speech when processed by a signal generation module.

In accordance with example embodiments, a parameter generation module of a speech synthesis system (e.g., TTS system) may include a neural network that can be trained to receive sequences of phoneme labels (or other types phonetic labels) in and/or accompanied by a wide variety of contexts, and to map them to acoustic feature vectors through a process of learning to account for the wide variety of contexts. More particularly, the speech database of a speech synthesis system may include a corpus that contains speech and text samples that collectively represent (e.g., via labels) a set or dictionary of phonemes, each associated with a very large number and variety of contexts. The meaning of "large number and variety of contexts" may be taken to correspond to a body large enough at least to stretch practical implementation limits of conventional techniques, necessitate at least some degree of approximation, and/or impose accuracy limits on generated feature vectors. The very challenge of such a large body of context information can be turned to an advantage in training a neural network, where a wide the variety of examples presented can lead to a wide the variety of examples learned, and correspondingly to versatility when the trained neural network is applied to data and circumstances beyond the training regime.

In accordance with example embodiments, input to the neural network can be a sequence of phonetic-context descriptors. As such, each phonetic-context descriptor in the sequence may include a phoneme label identifying a respective phoneme, as well as context information associated with the identified phoneme. The context information may include an indication of one or more left-context phoneme labels and/or one or more right-context phoneme labels. In addition, the context information may include a time or duration model that specifies how many frames of output should be generated for the identified phoneme, possibly as well as the number and identity of acoustic phases (states) that should be mapped to each output frame. Other context information may include intended physical production characteristics of the speech, linguistic context, and/or part of speech, for example. The output of the neural network can be a sequence of predicted feature vectors that serve as input to a signal generation module, each feature vector corresponding to one frame of waveform (audio) output from the signal generation module. By way of example, each frame could correspond to 5 milliseconds of speech waveform.

During a training phase, phonetic transcriptions of sample data in the speech database, referred to herein as "training-time phonetic transcriptions," may serve as input to the neural network. The term "training-time" is applied herein to identify an associated quantity (or quantities) as one that arises, is generated, or is used during the training phase. As described above, training-time phonetic transcriptions could be one or more training-time sequences of phonetic-context descriptors. The sample data may also include a collection of training-time text strings and corresponding sample training-time voice recordings, as well as "target" feature vectors.

Training may encompass training the neural network to map the training-time phonetic transcriptions of at least a subset of the training-time text strings into "training-time predicted feature vectors," which in turn correspond to quantitative descriptions of acoustic properties of the corresponding sample training voice recordings. For example, processing the training-time predicted feature vectors with the signal generation module could yield waveforms that match the corresponding sample training voice recordings to one or another specified level of accuracy. Note that the training process may not actually include synthesizing speech from the training-time predicted feature vectors, but could instead compare training-time predicted feature vectors with target feature vectors in order to learn to achieve accurate mapping of phonetic transcriptions to feature vectors. As noted, a large volume of sample data could represent a wide variety of contexts, thereby helping ensure that the neural network learns to accurately map phonemes in and/or accompanied by a wide variety of contexts.

Subsequent to training, the neural network may be employed in a run-time mode, in which one or more run-time text strings may be phonetically transcribed by the text analysis module to generate one or more run-time sequences of phonetic-context descriptors. The term "run-time" is applied herein to identify an associated quantity (or quantities) as one that arises, is generated, or is used during operation the run-time mode. The phonetic-context descriptors of the run-time sequences of may have the same format as the phonetic-context descriptors of the training-time sequences, differing possibly only in their specific content, owing to their generation from "new" (run-time) text strings that may not necessarily be found in the training data. The run-time sequences may then be input to the trained neural network, which may map them to sequences of run-time predicted feature vectors. Having been trained with a wide variety of training data, the neural network may produce accurate mappings of run-time sequences of phonetic-context descriptors to run-time predicted feature vectors, even for sequences of phonetic-context descriptors that it may not have previously encountered. Accordingly, a speech synthesis system that employs a neural network for acoustic parameter generation may synthesize speech of high voice quality over a broad range of run-time text (or other written form) input.

2. Example Method

In example embodiments, a speech synthesis system may include one or more processors, one or more forms of memory, one or more input devices/interfaces, one or more output devices/interfaces, and machine-readable instructions that when executed by the one or more processors cause the speech synthesis system to carry out the various functions and tasks described herein. The speech synthesis system may also include implementations of a neural network. In particular, the functions and tasks may form a basis for a method for speech synthesis with a deep neural network. An example of such a method is described in the current section.

FIG. 1 is a flowchart illustrating an example method in accordance with example embodiments. At step 102 a neural network that is implemented by one or more processors of a system that is trained to map one or more training-time sequences of phonetic-context descriptors received by the neural network into training-time predicted feature vectors that correspond to acoustic properties of predefined speech waveforms. The one or more training-time sequences of phonetic-context descriptors could correspond to phonetic transcriptions of training-time text strings, and the training-time text strings could correspond to written transcriptions of speech carried in the predefined speech waveforms. Both the training-time text strings and the corresponding predefined speech waveforms may be part of a corpus of sample speech included in a speech database. The corpus may also include target feature vectors that are associated with the predefined speech waveforms. For example, the target feature vectors could be generated from the predefined speech waveforms by a signal processor.

At step 104, a text analysis module implemented by the one or more processors receives a run-time text string. In the context of example embodiments, "training" refers to a mode of operation in which the system is operated and possibly adjusted using controlled and/or known data and outcomes (or results) in order to prepare the system for application to data and circumstances that may not be known and/or controlled. During "run-time" operation, the system may then be more generally used and/or applied to data and circumstances that may not be known and/or controlled. For example, the run-time text string could be received from a keypad or other text-based user interface of a computing device. Additionally or alternatively, the run-time text string could be received from a data file.

At step 106, the text analysis module processes the received run-time text string to generate a run-time sequence of phonetic-context descriptors that corresponds to a phonetic transcription of the run-time text string. In accordance with example embodiments, each phonetic-context descriptor of the run-time sequence could include a respective label identifying a phonetic speech unit of a plurality of phonetic speech units, data indicating phonetic context of the identified phonetic speech unit, and data indicating time duration of the identified phonetic speech unit.

At step 108, the trained neural network is used to process the run-time sequence of the phonetic-context descriptors in order to generate one or more run-time predicted feature vectors. The processing could involve mapping each phonetic-context descriptor of the input sequence to one or more run-time predicted feature vectors. In accordance with example embodiments, each of the run-time predicted feature vectors generated at this step, as well as each of the training-time predicted feature vectors generated at step 102, may include a set of acoustic metrics that determine acoustic properties of a corresponding waveform. For example, a signal generation module could translate the feature vectors into a waveform.

By way of example, the set of acoustic metrics in each feature vector could include Mel-Cepstral Coefficients, as described below. Other possible types of quantitative measures of acoustic properties could include Line Spectral pairs, Linear Predictive coefficients, Mel-Generalized Cepstral Coefficients, fundamental frequency ($f_0$), aperiodic measures, log power spectrum, or phase. In addition, each of the run-time predicted feature vectors, as well as each of the training-time predicted feature vectors, could further include a set of first-order time derivatives of the set of acoustic metrics, and a set of second-order time derivatives of the set of acoustic metrics, where the second-order time derivatives are time derivatives of the first-order time derivatives. It will be appreciated that feature vectors may not necessarily be restricted to including only one of these types of quantitative measures, but could also include more than one type.

Finally, at step 110, a signal generation module of the system processes the one or more run-time predicted feature vectors in order to produce and output a run-time speech waveform that corresponds to a spoken rendering of the run-time text string received at step 104 by the text analysis module. In accordance with example embodiments, the signal generation module could include a signal generating device, such as a vocoder, which generates the run-time speech waveform from the input run-time sequence of predicted feature vectors. Additionally or alternatively, generation of the output speech waveform could be based upon first matching the input sequence of run-time predicted feature vectors with predefined feature vectors in the speech database, and then identifying predefined speech waveform segments, also in the speech database, which correspond to the predefined feature vectors. Finally, the identified predefined speech waveforms could be concatenated to form or construct the output speech waveform. Note that the matching process need not yield exact matches, but could be statistical or probabilistic, where a "match" satisfies a likelihood threshold, for example. For either form of generating the run-time waveform, the output could be played on an audio output device, or recorded and saved as audio data on an audio recording medium, for example.

In accordance with example embodiments, the data indicating time duration of the respective phonetic speech unit in each phonetic-context descriptor of the run-time sequence of phonetic-context descriptors generated at step 106 could be a number that specifies how many consecutive temporal frames of acoustic data should be synthesized for the identified phonetic speech unit. More specifically, each of the run-time predicted feature vectors could correspond to a respective temporal frame of acoustic data in the run-time speech waveform. For example, each could represent a 5 millisecond frame of speech (waveform) data. The time duration data in each phonetic-context descriptor could specify how many feature vectors—and thus how many waveform frames—the identified phonetic speech unit should be mapped to. The time duration data could also include a time model that specifies how the acoustic states or phases of the identified phonetic speech unit evolve over the course of the one or more feature vectors to which it is mapped.

While the example method employs both a neural network (NN) and a text analysis module (possibly among other components), it will be appreciated that the NN and the text analysis module could themselves be implemented in more than one way, and by more than one configuration of processing devices and/or platforms. For example, the NN could be implemented by a first group of one or more processors, while the text analysis module could be implemented by a second group of one or more processors. Moreover, the first and second groups could be the same or different, or they could include one or more common processors. In addition, the algorithmic implementations of the NN and the text analysis module could be considered part of the example method, or could be ancillary to it, being provided as separate algorithmic components, for example.

In accordance with example embodiments, the training-time text strings and the predefined waveforms used at step 102 could be part of a corpus of speech data, and the phonetic-context descriptors of the training-time sequences could each have a similar content description and format to the phonetic-context descriptors of the run-time sequences of phonetic-context descriptors generated at step 106. Namely, each could be constructed from a phonetic label identifying a respective one of the phonetic speech units of the plurality of phonetic speech units, and each could include data indicating phonetic context of the identified one of the phonetic speech units, and data indicating time duration of the identified one of the phonetic speech units. The description above of the time duration data in the phonetic-context descriptors of the run-time sequences phonetic-context descriptors applies to the phonetic-context descriptors of the training-time sequences of phonetic-context descriptors as well.

In further accordance with example embodiments, all of the phonetic-context descriptors of the one or more training-time sequences could collectively make up at least a portion of all possible combinations of phonetic contexts of each of the phonetic speech units of the plurality. Accordingly, training the neural network to the map the one or more training-time sequences of phonetic-context descriptors received by the neural network into the training-time predicted feature vectors (at step 102) could then correspond to training the neural network to process at least the portion of all possible combinations of phonetic contexts of each of the phonetic speech units of the plurality. Training could further correspond to training the neural network to generate the training-time predicted feature vectors based at least in part on processing the phonetic context data in the phonetic-context descriptors of the one or more training-time sequences.

In still further accordance with example embodiments, processing the run-time sequence of the phonetic-context descriptors at step 108 with the trained neural network could correspond to receiving respective labels and phonetic context data in the phonetic-context descriptors of the run-time sequence, and then generating the run-time predicted feature vectors based at least in part on the received respective labels and phonetic context data in the phonetic-context descriptors of the run-time sequence. Since the number and variety of all possible combinations of phonetic contexts used to train the neural network (step 102) could be very large, the trained neural network may effectively and efficiently learn to process a significant number and variety of combinations of phonetic speech units and associated contexts likely to be encountered during run time.

By way of example, the identified phonetic speech units in both the training-time sequences and the run-time sequences of phonetic-context descriptors could be phonemes, and the identifying labels could be phoneme labels. As such, the data indicating phonetic context of the identified phoneme in each phonetic-context descriptor could also be one or more context-providing phoneme labels. For example, the phonetic context data could include phoneme labels identifying one or more temporally-prior phonemes (e.g., left-context phonemes), and one or more temporally-subsequent phonemes (e.g., right-context phonemes). The context data could also include indications of acoustic properties associated with physical characteristics of speech sounds and production, such as nasal, fricative, vowel, and vocal tract length, as well as of linguistic context (e.g., language and/or syntax rules) and parts of speech (e.g. vowel, consonant). In addition, context data could be indicative of characteristics such as speaker emotion, speaker gender, speaker identification, as well as speaking styles. All of the context indicators could take the form of one or more parameters associated with a classifying characteristic.

It will be appreciated that the steps shown in FIG. 1 are meant to illustrate a method in accordance with example embodiments. As such, various steps could be altered or modified, the ordering of certain steps could be changed, and additional steps could be added, while still achieving the overall desired operation.

3. Example Communication System and Device Architecture

Methods in accordance with an example embodiment, such as the on described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 2:
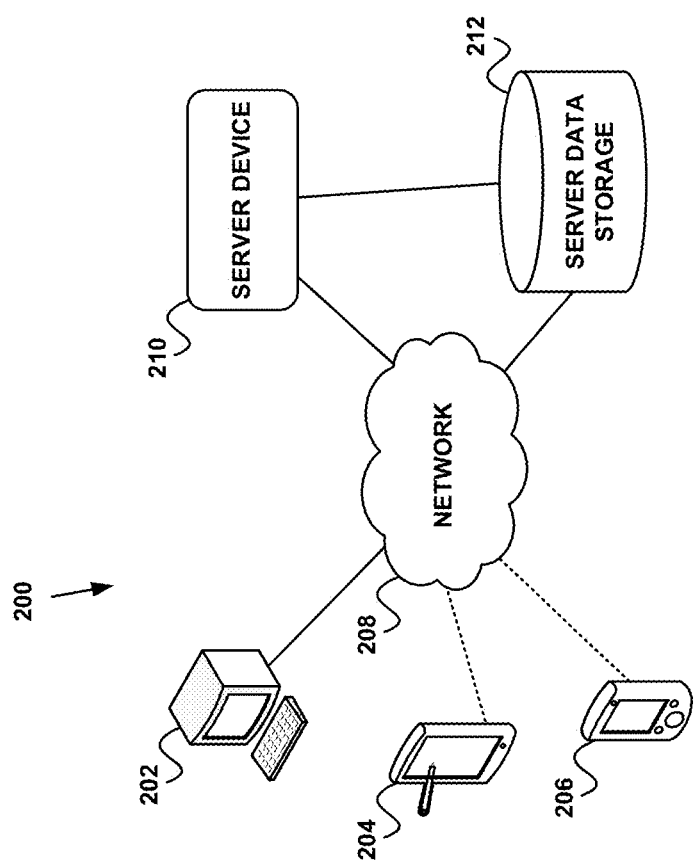
FIG. 2 is a block diagram of an example network and computing architecture, in accordance with an example embodiment.

FIG. 2 is a simplified block diagram of a communication system 200, in which various embodiments described herein can be employed. Communication system 200 includes client devices 202, 204, and 206, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 208 through the use of wireline connections (designated by solid lines) and/or wireless connections (designated by dashed lines).

Network 208 may be, for example, the Internet, or some other form of public or private Internet Protocol (IP) network. Thus, client devices 202, 204, and 206 may communicate using packet-switching technologies. Nonetheless, network 208 may also incorporate at least some circuit-switching technologies, and client devices 202, 204, and 206 may communicate via circuit switching alternatively or in addition to packet switching.

A server device 210 may also communicate via network 208. In particular, server device 210 may communicate with client devices 202, 204, and 206 according to one or more network protocols and/or application-level protocols to facilitate the use of network-based or cloud-based computing on these client devices. Server device 210 may include integrated data storage (e.g., memory, disk drives, etc.) and may also be able to access a separate server data storage 212. Communication between server device 210 and server data storage 212 may be direct, via network 208, or both direct and via network 208 as illustrated in FIG. 2. Server data storage 212 may store application data that is used to facilitate the operations of applications performed by client devices 202, 204, and 206 and server device 210.

Although only three client devices, one server device, and one server data storage are shown in FIG. 2, communication system 200 may include any number of each of these components. For instance, communication system 200 may comprise millions of client devices, thousands of server devices and/or thousands of server data storages. Furthermore, client devices may take on forms other than those in FIG. 2.

b. Example Server Device and Server System

Figure 3A:
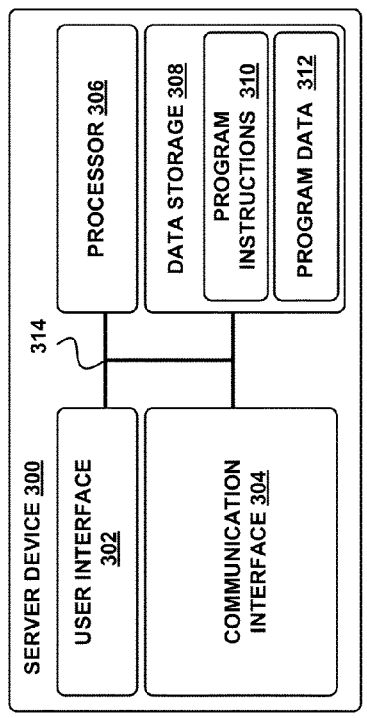
FIG. 3A is a block diagram of a server device, in accordance with an example embodiment.

FIG. 3A is a block diagram of a server device in accordance with an example embodiment. In particular, server device 300 shown in FIG. 3A can be configured to perform one or more functions of server device 210 and/or server data storage 212. Server device 300 may include a user interface 302, a communication interface 304, processor 306, and data storage 308, all of which may be linked together via a system bus, network, or other connection mechanism 314.

User interface 302 may comprise user input devices such as a keyboard, a keypad, a touch screen, a computer mouse, a track ball, a joystick, and/or other similar devices, now known or later developed. User interface 302 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 302 may be configured to generate audible output(s), via a speaker, speaker jack, audio output port, audio output device, earphones, and/or other similar devices, now known or later developed. In some embodiments, user interface 302 may include software, circuitry, or another form of logic that can transmit data to and/or receive data from external user input/output devices.

Communication interface 304 may include one or more wireless interfaces and/or wireline interfaces that are configurable to communicate via a network, such as network 208 shown in FIG. 2. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 304 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 306 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 306 may be configured to execute computer-readable program instructions 310 that are contained in data storage 308, and/or other instructions, to carry out various functions described herein.

Data storage 308 may include one or more non-transitory computer-readable storage media that can be read or accessed by processor 306. The one or more computer-readable storage media may include volatile and/or non-volatile storage components, such as optical, magnetic, organic or other memory or disc storage, which can be integrated in whole or in part with processor 306. In some embodiments, data storage 308 may be implemented using a single physical device (e.g., one optical, magnetic, organic or other memory or disc storage unit), while in other embodiments, data storage 308 may be implemented using two or more physical devices.

Data storage 308 may also include program data 312 that can be used by processor 306 to carry out functions described herein. In some embodiments, data storage 308 may include, or have access to, additional data storage components or devices (e.g., cluster data storages described below).

Referring again briefly to FIG. 2, server device 210 and server data storage device 212 may store applications and application data at one or more locales accessible via network 208. These locales may be data centers containing numerous servers and storage devices. The exact physical location, connectivity, and configuration of server device 210 and server data storage device 212 may be unknown and/or unimportant to client devices. Accordingly, server device 210 and server data storage device 212 may be referred to as "cloud-based" devices that are housed at various remote locations. One possible advantage of such "cloud-based" computing is to offload processing and data storage from client devices, thereby simplifying the design and requirements of these client devices.

In some embodiments, server device 210 and server data storage device 212 may be a single computing device residing in a single data center. In other embodiments, server device 210 and server data storage device 212 may include multiple computing devices in a data center, or even multiple computing devices in multiple data centers, where the data centers are located in diverse geographic locations. For example, FIG. 2 depicts each of server device 210 and server data storage device 212 potentially residing in a different physical location.

Figure 3B:
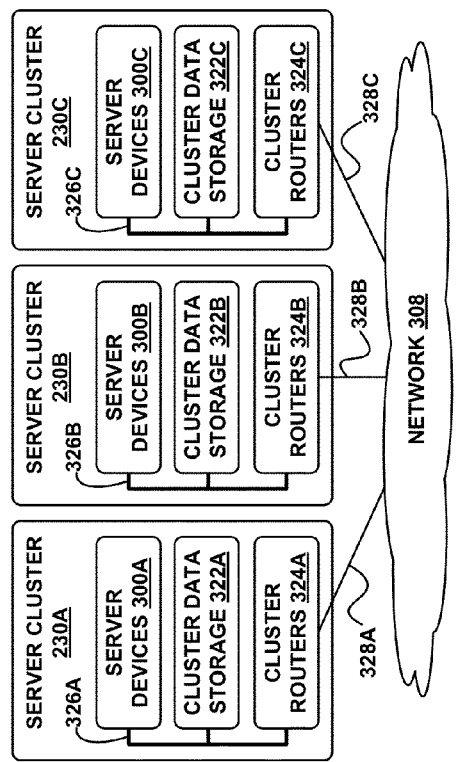
FIG. 3B depicts a cloud-based server system, in accordance with an example embodiment.

FIG. 3B depicts an example of a cloud-based server cluster. In FIG. 3B, functions of server device 210 and server data storage device 212 may be distributed among three server clusters 320A, 320B, and 320C. Server cluster 320A may include one or more server devices 300A, cluster data storage 322A, and cluster routers 324A connected by a local cluster network 326A. Similarly, server cluster 320B may include one or more server devices 300B, cluster data storage 322B, and cluster routers 324B connected by a local cluster network 326B. Likewise, server cluster 320C may include one or more server devices 300C, cluster data storage 322C, and cluster routers 324C connected by a local cluster network 326C. Server clusters 320A, 320B, and 320C may communicate with network 308 via communication links 328A, 328B, and 328C, respectively.

In some embodiments, each of the server clusters 320A, 320B, and 320C may have an equal number of server devices, an equal number of cluster data storages, and an equal number of cluster routers. In other embodiments, however, some or all of the server clusters 320A, 320B, and 320C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 320A, for example, server devices 300A can be configured to perform various computing tasks of a server, such as server device 210. In one embodiment, these computing tasks can be distributed among one or more of server devices 300A. Server devices 300B and 300C in server clusters 320B and 320C may be configured the same or similarly to server devices 300A in server cluster 320A. On the other hand, in some embodiments, server devices 300A, 300B, and 300C each may be configured to perform different functions. For example, server devices 300A may be configured to perform one or more functions of server device 210, and server devices 300B and server device 300C may be configured to perform functions of one or more other server devices. Similarly, the functions of server data storage device 212 can be dedicated to a single server cluster, or spread across multiple server clusters.

Cluster data storages 322A, 322B, and 322C of the server clusters 320A, 320B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 210 and server data storage device 212 can be distributed across server clusters 320A, 320B, and 320C, various active portions and/or backup/redundant portions of these components can be distributed across cluster data storages 322A, 322B, and 322C. For example, some cluster data storages 322A, 322B, and 322C may be configured to store backup versions of data stored in other cluster data storages 322A, 322B, and 322C.

Cluster routers 324A, 324B, and 324C in server clusters 320A, 320B, and 320C, respectively, may include networking equipment configured to provide internal and external communications for the server clusters. For example, cluster routers 324A in server cluster 320A may include one or more packet-switching and/or routing devices configured to provide (i) network communications between server devices 300A and cluster data storage 322A via cluster network 326A, and/or (ii) network communications between the server cluster 320A and other devices via communication link 328A to network 308. Cluster routers 324B and 324C may include network equipment similar to cluster routers 324A, and cluster routers 324B and 324C may perform networking functions for server clusters 320B and 320C that cluster routers 324A perform for server cluster 320A.

Additionally, the configuration of cluster routers 324A, 324B, and 324C can be based at least in part on the data communication requirements of the server devices and cluster storage arrays, the data communications capabilities of the network equipment in the cluster routers 324A, 324B, and 324C, the latency and throughput of the local cluster networks 326A, 326B, 326C, the latency, throughput, and cost of the wide area network connections 328A, 328B, and 328C, and/or other factors that may contribute to the cost, speed, fault-tolerance, resiliency, efficiency and/or other design goals of the system architecture.

c. Example Client Device

Figure 4:
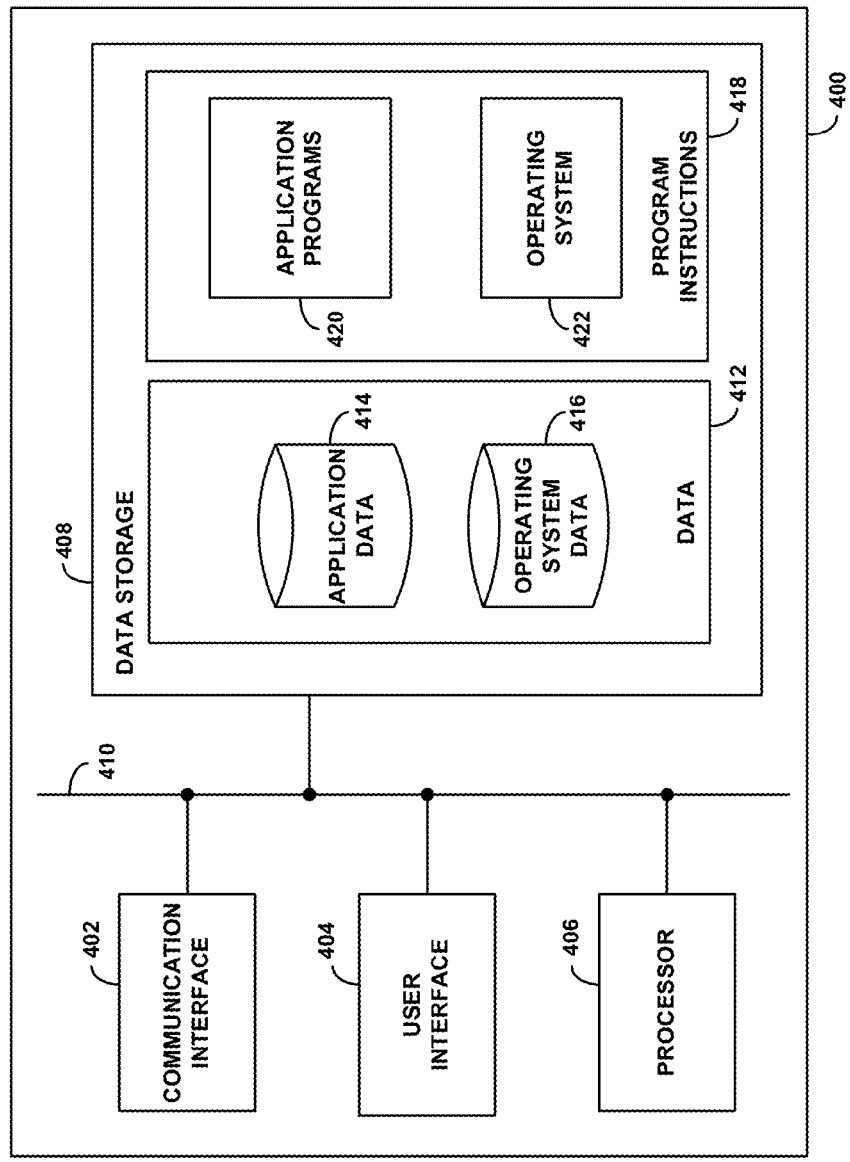
FIG. 4 depicts a block diagram of a client device, in accordance with an example embodiment.

FIG. 4 is a simplified block diagram showing some of the components of an example client device 400. By way of example and without limitation, client device 400 may be or include a "plain old telephone system" (POTS) telephone, a cellular mobile telephone, a still camera, a video camera, a fax machine, an answering machine, a computer (such as a desktop, notebook, or tablet computer), a personal digital assistant (PDA), a wearable computing device, a home automation component, a digital video recorder (DVR), a digital TV, a remote control, or some other type of device equipped with one or more wireless or wired communication interfaces.

As shown in FIG. 4, client device 400 may include a communication interface 402, a user interface 404, a processor 406, and data storage 408, all of which may be communicatively linked together by a system bus, network, or other connection mechanism 410.

Communication interface 402 functions to allow client device 400 to communicate, using analog or digital modulation, with other devices, access networks, and/or transport networks. Thus, communication interface 402 may facilitate circuit-switched and/or packet-switched communication, such as POTS communication and/or IP or other packetized communication. For instance, communication interface 402 may include a chipset and antenna arranged for wireless communication with a radio access network or an access point. Also, communication interface 402 may take the form of a wireline interface, such as an Ethernet, Token Ring, or USB port. Communication interface 402 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

User interface 404 may function to allow client device 400 to interact with a human or non-human user, such as to receive input from a user and to provide output to the user. Thus, user interface 404 may include input components such as a keypad, keyboard, touch-sensitive or presence-sensitive panel, computer mouse, trackball, joystick, microphone, still camera and/or video camera. User interface 404 may also include one or more output components such as a display screen (which, for example, may be combined with a touch-sensitive panel), CRT, LCD, LED, a display using DLP technology, printer, light bulb, and/or other similar devices, now known or later developed. User interface 404 may also be configured to generate audible output(s), via a speaker, speaker jack, audio output port, audio output device, earphones, and/or other similar devices, now known or later developed. In some embodiments, user interface 404 may include software, circuitry, or another form of logic that can transmit data to and/or receive data from external user input/output devices. Additionally or alternatively, client device 400 may support remote access from another device, via communication interface 402 or via another physical interface (not shown).

Processor 406 may comprise one or more general purpose processors (e.g., microprocessors) and/or one or more special purpose processors (e.g., DSPs, GPUs, FPUs, network processors, or ASICs). Data storage 408 may include one or more volatile and/or non-volatile storage components, such as magnetic, optical, flash, or organic storage, and may be integrated in whole or in part with processor 406. Data storage 408 may include removable and/or non-removable components.

In general, processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by client device 400, cause client device 400 to carry out any of the methods, processes, or functions disclosed in this specification and/or the accompanying drawings. The execution of program instructions 418 by processor 406 may result in processor 406 using data 412.

By way of example, program instructions 418 may include an operating system 422 (e.g., an operating system kernel, device driver(s), and/or other modules) and one or more application programs 420 (e.g., address book, email, web browsing, social networking, and/or gaming applications) installed on client device 400. Similarly, data 412 may include operating system data 416 and application data 414. Operating system data 416 may be accessible primarily to operating system 422, and application data 414 may be accessible primarily to one or more of application programs 420. Application data 414 may be arranged in a file system that is visible to or hidden from a user of client device 400.

Application programs 420 may communicate with operating system 412 through one or more application programming interfaces (APIs). These APIs may facilitate, for instance, application programs 420 reading and/or writing application data 414, transmitting or receiving information via communication interface 402, receiving or displaying information on user interface 404, and so on.

In some vernaculars, application programs 420 may be referred to as "apps" for short. Additionally, application programs 420 may be downloadable to client device 400 through one or more online application stores or application markets. However, application programs can also be installed on client device 400 in other ways, such as via a web browser or through a physical interface (e.g., a USB port) on client device 400.

4. Example System and Operation a. Example Speech Synthesis System

Figure 5:
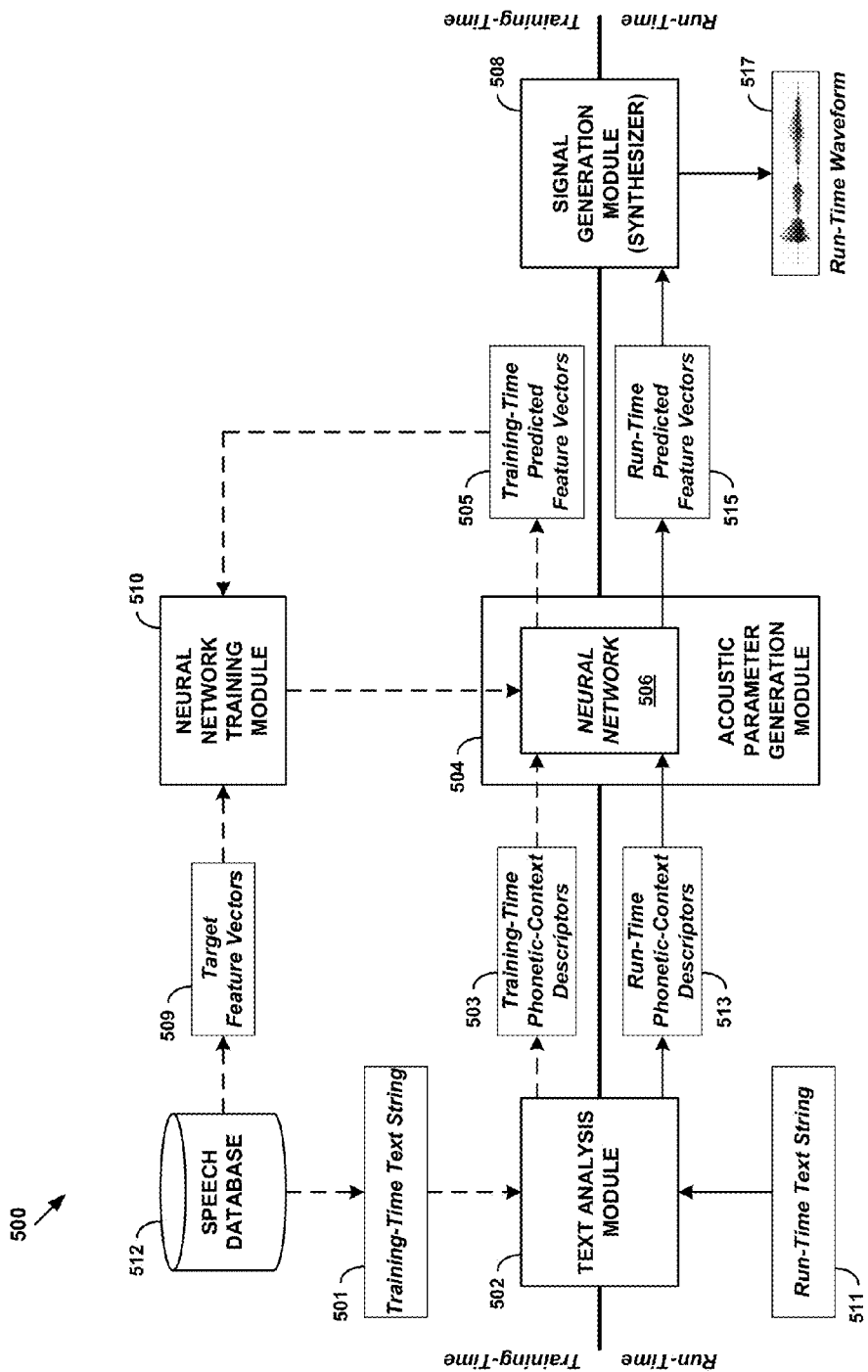
FIG. 5 depicts a block diagram of a speech synthesis system, in accordance with an example embodiment.

FIG. 5 depicts a block diagram of an example speech synthesis system 500 in which an example embodiment of speech synthesis using a deep neural network could be carried out. In addition to functional components, FIG. 5 also shows selected example inputs, outputs, and intermediate products of example operation. The functional components of the speech synthesis system 500 include a text analysis module 502, an acoustic parameter generation module 504 that includes a neural network 506, a signal generation module (speech synthesizer) 508, and a speech database 512. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

The figure is depicted in a way the represents two operational modes: training-time and run-time. A thick, horizontal line marks a conceptual boundary between these two modes, with "Training-Time" labeling a portion of FIG. 5 above the line, and "Run-Time" labeling a portion below the line. For purposes of organizing the present discussion, various arrows in the figure signifying information and/or processing flow and/or transmission are shown as dashed lines in the "Training-Time" portion of the figure, and as solid lines in the "Run-Time" portion.

During training, a training-time text string 501 from the speech database 512 may be input to the text analysis module 502, which then generates training-time phonetic-context descriptors 503. As described above, each phonetic-context descriptor could be made up of a phonetic label identifying a phonetic speech unit (e.g., a phoneme label identifying a phoneme), context information (e.g., one or more left-context and right-context phoneme labels, physical speech production characteristics, linguistic context, etc.), and timing information, such as a duration, relative timing position, and/or phonetic state model. It should be appreciated that the timing information could itself be considered part of the context information. However, it is called out separately herein in order to distinguish how it may apply in the generation of feature vectors from the other type of context information.

The training-time phonetic-context descriptors 503 are then input to the acoustic parameter generation module 504, which maps the training-time phonetic-context descriptors to one or more training-time predicted feature vectors 505. In accordance with example embodiments, the acoustic parameter generation module 504 could be implemented as, or include, a deep neural network, such as neural network 506, as described below in more detail.

By way of example, the acoustic parameters in each given training-time predicted feature vector could include Mel-Cepstral Coefficients (MCCs). MCCs may represent the short-term power spectrum of a portion of the waveform to be synthesized from the given training-time predicted feature vector, and may be based on, for example, a linear Fourier transform of a log power spectrum on a nonlinear Mel scale of frequency. (A Mel scale may be a scale of pitches subjectively perceived by listeners to be about equally distant from one another, even though the actual frequencies of these pitches are not equally distant from one another.)

First-order cepstral coefficient time derivatives may be calculated based on the slopes of linear regressions performed over windows of two or more consecutive frames. Second-order cepstral coefficient time derivatives may be calculated based on the slopes of linear regressions performed over windows of two or more consecutive sets of first-order cepstral coefficient time derivatives. However, there may be other ways of calculating the first-order and second-order cepstral coefficient time derivatives.

In some embodiments, one or more frames of waveform data may be represented by a training-time predicted feature vector of MCCs, first-order cepstral coefficients time derivatives, and second-order cepstral coefficient time derivatives. For example, the training-time predicted feature vector may contain 40 coefficients, 40 first-order derivatives, and 40 second-order derivatives, therefore having a length of 120. However, training-time predicted feature vectors may use different combinations of features in other possible embodiments. As another example, training-time predicted feature vectors could include Line Spectral pairs, Linear Predictive coefficients, Mel-Generalized Cepstral Coefficients, fundamental frequency ($f_0$), aperiodic measures, or log power spectrum, phase, or some combination thereof.

The training-time predicted feature vectors 505 are next input to a neural network training module 510. The neural network training module 510 also receives or has access to target feature vectors 509 stored the speech database 512. The target feature vectors 509 correspond to sample speech waveforms, which themselves are associated with training-time text strings, including the training-time text string 501. For example, speech samples may be created by a speaker reading sample text strings. The speech samples and/or sub-segments of them may be stored in the speech database 512, together with their associated text strings (and/or associated text-string sub-segments). The stored sample text strings (and/or text-string sub-segments) could then be used as the training-time text strings (such as training-time text string 501).

As part of training (e.g., during or prior to), the associated speech samples and/or speech sample sub-segments could be processed with a signal processor (e.g. a digital signal processor) to generate target feature vectors associated with the stored sample text strings (and/or text-string sub-segments). The neural network training module 510 may function to compare the training-time predicted feature vectors 505 output by the neural network 506 with the target feature vector 509 obtained from the speech database 512 in order to update and/or adjust parameters (e.g., weights) of the neural network 506. More specifically, the neural network 506 may perform "forward propagation" of the input training-time phonetic-context descriptors 503 to generate the training-time predicted feature vectors 505, and the neural network training module 510 may perform "back propagation" the inputs the input neural network training module 510 to update the neural network 506. The dashed arrow from the neural network training module 510 to the neural network 506 represents the updating step.

Through a process of repeated generation of training-time predicted feature vectors, such as training-time predicted feature vectors 505, comparison with target feature vectors, such as target feature vectors 509, and updating of the neural network 506, the neural network 506 (and correspondingly the acoustic parameter generation module 504) may be adjusted or trained to generate training-time predicted feature vectors that accurately represent the target feature vectors. In doing so, the neural network 506 (and correspondingly the acoustic parameter generation module 504) may thereby be trained to generate training-time predicted feature vectors that yield good quality speech when translated into a waveform by a signal generation module. By further applying the training procedure to large corpus in the speech database, the neural network 506 (and correspondingly the acoustic parameter generation module 504) may be trained to accomplish this task for a wide variety and range of speech samples, which may then enable similarly accurate operation when applied to a wide variety and range of input text (or other forms of written language) from beyond the training regime of the speech database during run-time operation.

Note that the neural network training module 510 could implement a variety of techniques for training the neural network 506. More particularly, there are a number of techniques that can be used to train a neural network. These may include stochastic gradient descent, batch gradient descent, second order methods, Hessian-free optimization, and gradient boost, among possibly others. The training process could involve minimizing the mean-square error between the training-time predicted feature vectors 505 and the target feature vectors 509.

During run-time operation, illustrated in the lower portion of FIG. 5 (below thick horizontal line), a run-time text string 511 is input to the text analysis module 502, which then generates run-time phonetic-context descriptors 513. As described above, each run-time phonetic-context descriptor could be made up of a phonetic label identifying a phonetic speech unit (e.g., a phoneme label identifying a phoneme), context information (e.g., one or more left-context and right-context phoneme labels, physical speech production characteristics, linguistic context, etc.), and timing information, such as a duration/phonetic state model. As with the training-time phonetic-context descriptor, timing information is called out separately from other context information in order to distinguish how it may apply in the generation of run-time predicted feature vectors.

The run-time phonetic-context descriptors 513 are then input to the acoustic parameter generation module 504, which maps the to one or more run-time predicted feature vectors 515. The description of acoustic parameters (e.g. MCCs, etc.) described above in the context of training-time predicted feature vectors applies as well to acoustic parameters included in run-time predicted feature vectors.

Each run-time predicted feature vector could correspond to a frame of waveform data. For example, each frame could correspond to a sliding time window that is periodically advanced. Each advance of the time window could be in increments measured in fractional units of the width of the time window. By way of example, the width of each frame (and of the sliding time window) could be 25 milliseconds (ms), and the time increment between each frame acquisition could be 5 ms. With this configuration, each new 25 ms frame could carry 10 ms of new waveform data and overlap 20 ms with the previous 25 ms. Other frame sizes, window sizes, and time increment sizes could be used as well. For example, each frame could be 10 ms, with no overlap between consecutive frames.

The run-time predicted feature vectors 515 are next input to the signal generation module 508, which may then synthesize a run-time waveform 517. A signal generation module, which could be a component of a speech synthesizer, may include a vocoder that can translate the acoustic features of the input into an output waveform suitable for playout on an audio output device, and/or for analysis by a signal measuring device or element. Such a device or element could be based on signal measuring hardware and/or machine language instructions that implement an analysis algorithm. As noted above, generation of the output speech waveform could additionally or alternatively be based upon first matching the input run-time predicted feature vectors with predefined feature vectors in the speech database 512, and then identifying predefined speech waveform segments, also in the speech database 512, which correspond to the predefined feature vectors. Finally, the identified predefined speech waveforms could be concatenated to form or construct the output speech waveform. Note that the matching process need not yield exact matches, but could be statistical or probabilistic, where a "match" satisfies a likelihood threshold, for example.

In accordance with example embodiments, the training of the neural network 506 used to implement the acoustic parameter generation module 504 helps ensure that the synthesized run-time waveform 517 is an accurate rendering of the input run-time text string 511, even though the run-time text string 511 may have not been previously encountered by the speech synthesis system 500.

It should be noted that the discussion in this section, and the accompanying figure, are presented for purposes of example. Other speech synthesis system arrangements, including different components, different relationships between the components, and/or different processing, may be possible.

b. Context and Timing Information

As discussed above, the text analysis module 502 receives one or more text strings as input, and generates phonetic-context descriptors that correspond to phonetic transcriptions of the input text strings, in accordance with example embodiments. The training-time phonetic-context descriptors 503 and the run-time phonetic-context descriptors 513 are generally configured to have the same format, at least for the purpose of ensuring consistency of operation for both training and run-time text strings. In particular, each phonetic-context descriptor may include a phonetic label identifying a phonetic speech unit, together with context and timing information. For the purposes of the discussion herein, one of the terms "training-time" or "run-time" has generally added to the term phonetic-context descriptor in order to distinguish between operational modes of a speech synthesis system. However, the two terms do not necessarily signify any difference between the formats or types of content of phonetic-context descriptors.

In accordance with example embodiments, the label-identified phonetic speech unit of a phonetic-context descriptor may be a phoneme. Phonemes may be considered to be the smallest segment of a spoken utterance (e.g., a word, phrase, or sentence) that encompasses a meaningful contrast with other segments of utterances. Thus, a word typically includes one or more phonemes. Customarily, phonemes are represented in written form as one or more letters that specify how the phoneme is pronounced in speech.

Conventionally, the letters representing a phoneme are placed with forward slashes. For example, in American English, /ae/ may be taken to represent the phoneme corresponding to the a-sound as pronounced in the word "cat." The phonemic spelling for the American English pronunciation of the word "cat" is /k/ /ae/ /t/, and consists of the phonemes identified by /k/, /ae/, and /t/. Another example is the phonemic spelling for the word "dog" is /d/ /aw/ /g/, consisting of the phonemes identified by /d/, /aw/, and /g/. Different phonemic alphabets exist, and other phonemic representations are possible. Common phonemic alphabets for American English contain about 40 distinct phonemes. Each of these phonemes can be represented in a quantifiable form as a distribution of feature vector values.

While the letters representing the written form of a phoneme are sometimes (loosely) taken to be the phoneme, it may be more appropriate, at least in the context of speech synthesis, to consider the letters to constitute a label that identifies the associated phoneme. Thus, for example, the letters "/ae/" may be used as a label to identify the phoneme that when spoke is pronounced as the a-sound as pronounced in the word "cat." With this usage, the letters "/k/ /ae/ /t/" may be used to specify a sequence of phoneme labels that a sequence of identified phonemes.

For a given phoneme label in a sequence of phoneme labels, neighboring phoneme labels—i.e., labels preceding and/or following the given phoneme label—identify phonemes that are intended to precede and/or follow the given phoneme in the speech segment represented by the sequence. By convention, a preceding phoneme is called a "left context" phoneme and a following (subsequent) phoneme is called the "right context" phoneme. Correspondingly, a preceding phoneme label is called the "left context" label and a following (subsequent) phoneme is called the "right context" label. There can be more than one each left and/or right context phonemes (and phoneme labels) for a given identified phoneme (and given phoneme label). In accordance with example embodiments, context information for a given identified phoneme in phonetic-context descriptor may include one or more left-context phoneme labels and/or one or more right-context phoneme labels.

As mentioned earlier, the manifestation of a given phoneme in a spoken utterance may evolve across multiple time steps within one or more frames, or over multiple acoustic phases or states, or both. For example, phonemes can be modeled as evolving over three sequential states. For speech synthesis, timing information in the form of a "duration model" may be used to specify how many frames of waveform data a phoneme should last for, possibly as well as the ordering and duration of each of the phoneme states. In further accordance with example embodiments, each phonetic-context descriptor may also include a duration model for the identified given phoneme of the descriptor.

The duration model may simply specify a number of frames of waveform data to generate for the identified given phoneme and/or particular time steps within a frame. This information may then be used to determine the number of feature vectors to which the given phoneme is mapped (e.g., by the acoustic parameter generation module 504). A more complex duration model may specify how the phoneme states evolve across frames. For example, the duration model could specify a response as a function of time. In this case, the information could be used to determine the ordering and duration of phoneme states as mapped to feature vectors.

In accordance with example embodiments, a duration model may be generated by the text analysis module 502, taking account of context information, such as left-context and right-context phonemes, physical speech production characteristics, and linguistic context. Techniques for generating duration models are generally known.

Other types and/or forms of context information contained in phonetic-context descriptor may include: position of the identified phoneme in a syllable; phrasing; part of speech; number of stressed syllables after and/or before the current syllable in the current phrase; position of phrase in utterance; number of syllables to previous and/or next stressed syllable; position of word in phrase; vowel of syllable; number of content words; number of syllables in a phrase; number of words in phrase; number of phrases in utterance; number of words in an utterance; and number of syllables in utterance. Moreover, certain features may be extracted or deduced from an input text string. Some such features can include: phonetic, syllabic, grammatical, morphological, grammatical, semantic, tonal (e.g., Mandarin), prosodic (e.g., pitch accent in Japanese). In addition to the features extracted or deduced from texts, certain para-linguistic features can be added, such as emotion, speaking styles. Additional information can be used to convey gender, age, language, dialect, and speaker identification. The above lists are not intended to be limiting.

c. Example Neural Network Implementation

Figure 6:
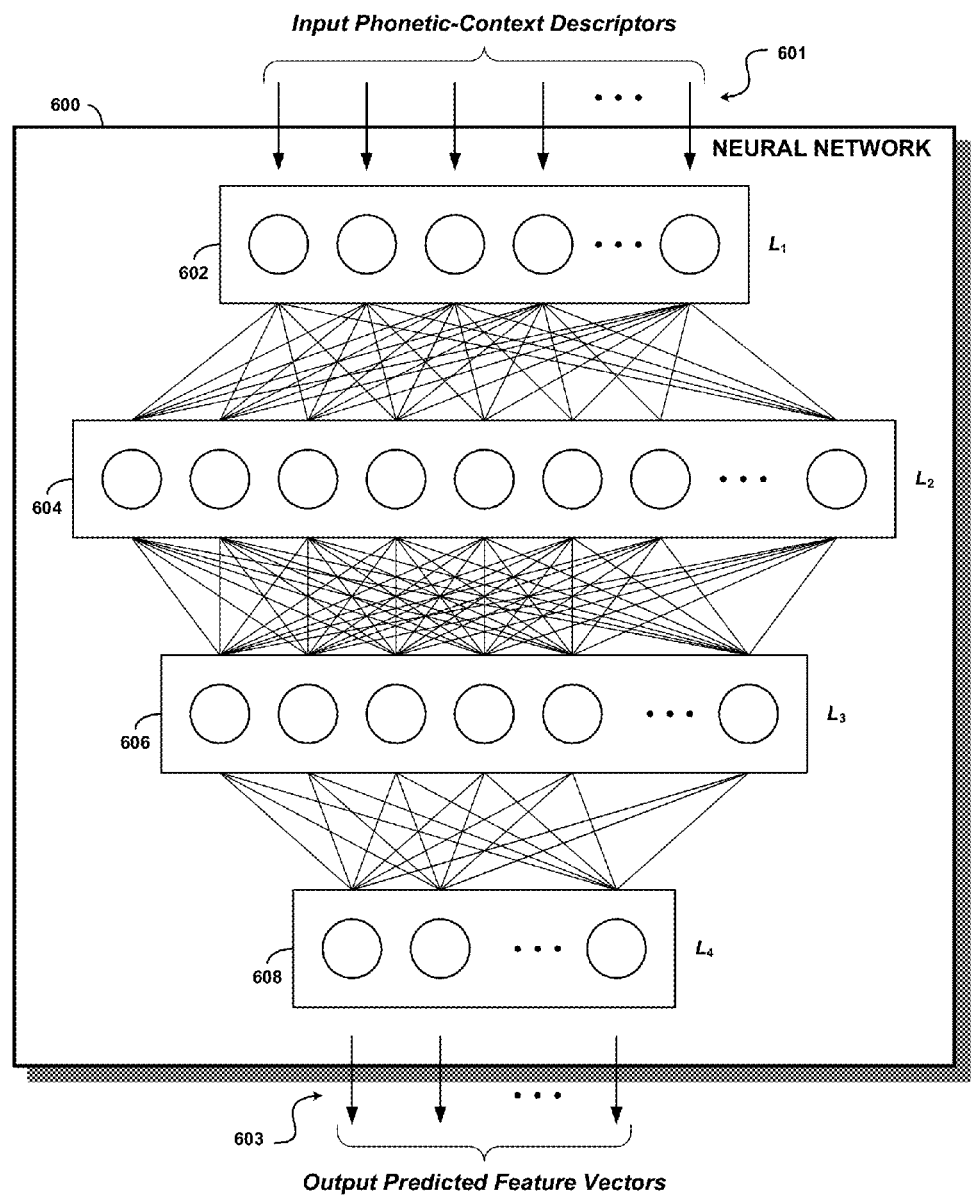
FIG. 6 is a schematic illustration of a neural network that can be used for generating acoustic feature vectors, in accordance with an example embodiment.

As described above, the acoustic parameter generation module 504 of the example speech synthesis system 500 may be implemented using a deep neural network, such as the neural network 506, in accordance with example embodiments. FIG. 6 is a schematic illustration of one type a neural network, namely a "feed-forward" neural network, that could be used for mapping phonetic transcriptions (e.g. training-time phonetic-context descriptors 503 and/or run-time phonetic-context descriptors 513) to acoustic feature vectors (e.g. training-time predicted feature vectors 505 and/or run-time predicted feature vectors 515). As shown, a neural network 600 includes "layers" 602, 604, 606, and 608, labeled $L_1$, $L_2$, $L_3$, and $L_4$, respectively. Each layer includes a set of nodes, represented as circles in FIG. 6. Horizontal ellipses in each layer signify possible nodes in addition to the ones explicitly shown. The number of layers (four) and the number of nodes shown are just examples for the purposes of illustration. Any particular neural network could have more or fewer layers and/or nodes.

The layer 602 ($L_1$) receives input, and may be referred to as an input layer. In the example of FIG. 6, the input is an input phonetic-context descriptor 601 (represented as vertical arrows), which could be part of a sequence of phonetic-context descriptors that make up a phonetic transcription. The horizontal ellipses signify possible feature vectors in addition to the ones explicitly shown. The layer 608 ($L_4$) delivers output, and may be referred to as an output layer. In the example of FIG. 6, the output is one or more output acoustic feature vectors 603 (represented as vertical arrows), each corresponding to a frame of to-be-synthesized waveform data. The horizontal ellipses signify possible emission probabilities in addition to the ones explicitly shown. The layers 604 ($L_2$) and 606 ($L_3$) may sometimes be referred to as "hidden layers."

Each node in the neural network 600 may correspond to a mathematical function having adjustable parameters, and from which can be computed a scalar output of one or more inputs. All of the nodes may be the same scalar function, differing only according to possibly different parameter values, for example. By way of example, the mathematical function could take the form of a sigmoid function. It will be appreciated that other functional forms could be used as well. As shown, the output of each node of a given layer is connected to the input of every node in the next layer, except that the input layer receives its input from data presented to the neural network (e.g., phonetic-context descriptors 601 in the present example), and the output layer delivers output data from the neural network (e.g., output acoustic feature vectors 603 in the present example). Taking the example of a sigmoid function, each node could compute a sigmoidal nonlinearity of a weighted sum of its inputs.

By appropriately adjusting the respective parameter values of the functions of the nodes during a training process, the neural network 600 can learn how to later generate and output run-time predicted feature vectors in response to receiving phonemes, context, and timing information of run-time phonetic-context descriptors input at run time.

A variety of known techniques may be used to train a neural network. These may include stochastic gradient descent, batch gradient descent, second order methods, Hessian-free optimization, and gradient boost, among possibly others.

A neural network, such as neural network 600, including its layers, nodes, and connections between nodes may be implemented as executable instructions stored in one or another form of non-transient computer readable media, and executed by one or more processors of speech synthesis system, for example.

It will be appreciated that the feed-forward neural network illustrated in FIG. 6 is just one type of neural network that could be used for generation of feature vectors from input phonetic-context descriptors. Other types could include Recurrent Neural Networks and Bidirectional Recurrent Neural Networks. More generally, neural networks may be considered as implementations of a variety classes of regression algorithms and function approximators, including but not limited to conventional back-propagation neural networks, convolutional networks, time-delay neural networks, and mixture-density networks. Accordingly, the feed-forward neural network illustrated in FIG. 6 should not be viewed as limiting the scope of example embodiments described herein.

d. Example Operation of Acoustic Parameter Generation with a Neural Network

Figure 7:
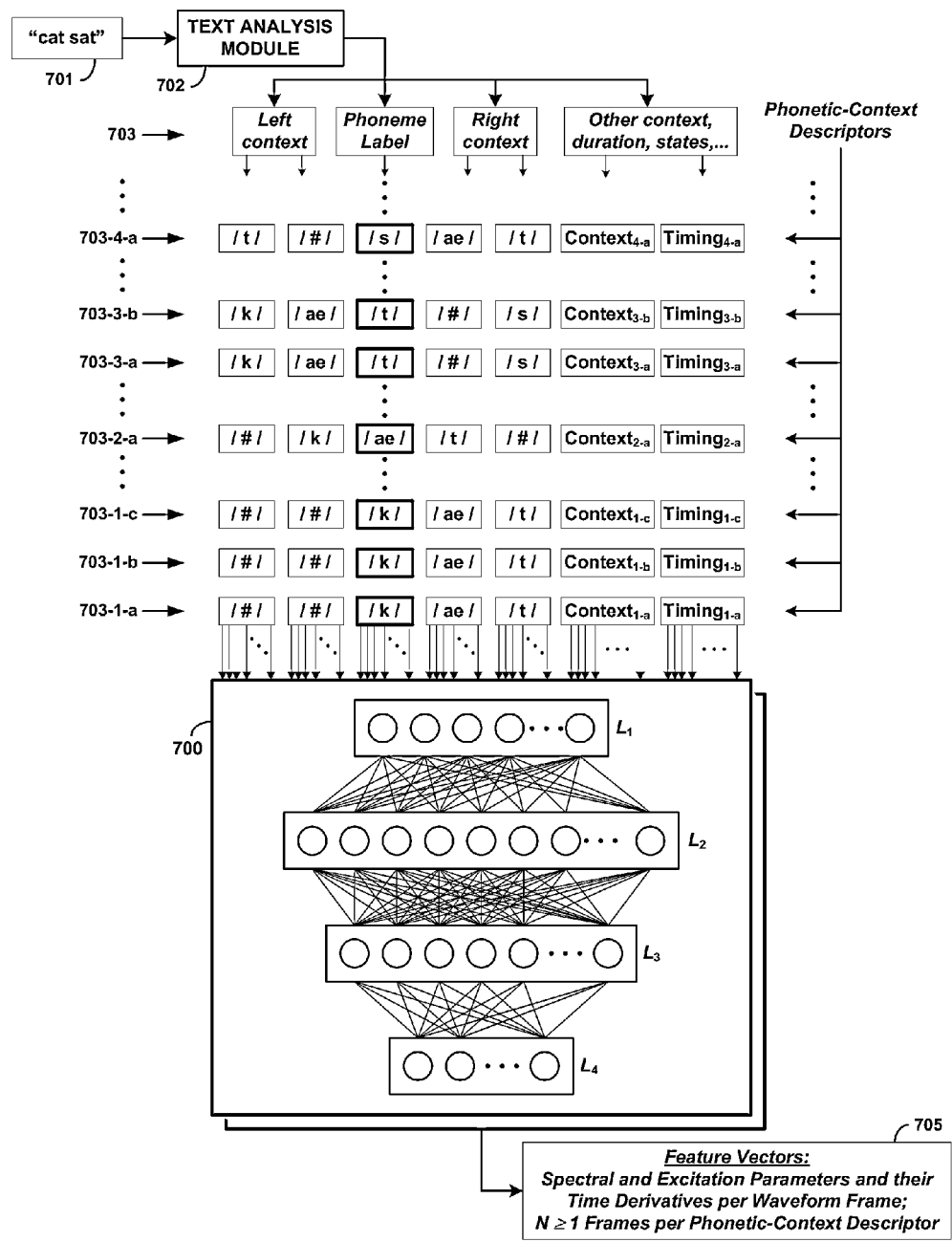
FIG. 7 is a schematic illustration of inputting a phonetic transcription of an example text string to a neural network, in accordance with an example embodiment.

FIG. 7 is schematic illustration of inputting a phonetic transcription of an example text string to a neural network 700, in accordance with example embodiments. In keeping with the example of a feed-forward neural network (and with the understanding that other types of neural networks could be employed in accordance with example embodiments), the neural network 700 is again represented by layers $L_1$, $L_2$, $L_3$, and $L_4$, as in FIG. 6. In the present illustration, an example text string 701 containing "cat sat" is input to a text analysis module 702. The output of the text analysis module 702 is a sequence of phonetic-context descriptors 703-1-$(a,b,c)$, 703-2-$a$, 703-3-$(a,b)$, and 703-4-$a$, which represent just a portion of phoneme labels of the transcribed input text string. The tags "(a,b,c)" and the like signify different time steps of a given input phoneme label. By way of example, the context information for each input phoneme label includes two left-context phoneme labels and two right-context phoneme labels for each given phoneme label of the transcription. Other numbers of left-context and right-context phoneme labels could be used, and the number of left-context and right-context phoneme labels need not be equal.

For the example input text string 701, the phoneme sequence of the transcription is "/#/ /c/ /ae/ /t/ /#/ /s/ /ae/ /t/ /#/," where the "/#/s" signify a boundary or pause at the start, end, and between words. As shown, the first phonetic-context descriptor 703-1-a, input at a first time step, includes the phoneme labels "/#/ /#/ /k/ /ae/ /t/," each within a rectangular border for illustrative purposes. The phoneme "/k/" is shown in bold font and with a bold rectangular border in order to indicate that it is the current phoneme label of the transcription sequence; the other context phoneme labels are shown in normal font and within a thin-lined rectangular border. The first phonetic-context descriptor 703-1-a also includes other context information "Context$_{1-a}$" and "Timing$_{1-a}$."

The second phonetic-context descriptor 703-1-b, input at the next (second) time step, includes the same phoneme labels "/#/ /#/ /k/ /ae/ /t/" as the first phonetic-context descriptor 703-1-a. The second phonetic-context descriptor 703-1-b also includes other context information "Context$_{1-b}$" and "Timing$_{1-b}$," which may be different form that contained in "Context$_{1-a}$" and "Timing$_{1-a}$." This illustrates how a given identified phoneme (e.g., the phoneme identified by /k/), together with its phoneme context, may be input to the neural network 700 at multiple, consecutive (sequential) time steps, but with different context (other than phoneme context) and timing information.

The third phonetic-context descriptor 703-1-c, input at the next (third) time step, again includes the same phoneme labels "/#/ /#/ /k/ /ae/ /t/" as the first and second phonetic-context descriptors 703-1-(a,b). The third phonetic-context descriptor 703-1-c also includes other context information "Context$_{1-c}$" and "Timing$_{1-c}$," which may be different form that contained in "Context$_{1-a}$" and "Timing$_{1-a}$" and/or that contained in "Context$_{1-b}$" and "Timing$_{1-b}$."

In the figure, vertical ellipses between the phonetic-context descriptors 703-1-c and 703-2-a represent possibly additional phonetic-context descriptors 703-1-(d, . . . ). The phonetic-context descriptor 703-2-a includes the phoneme labels "/#/ /k/ /ae/ /t/ /#/," where the given identified phoneme is "/ae/" and the other phoneme labels provide phoneme context. The vertical ellipses between the phonetic-context descriptors 703-2-a and 703-3-a represent possibly additional phonetic-context descriptors 703-2-(b, . . . ) for "/#/ /k/ /ae/ /t/ /#/," but at successive time steps.

A similar explanation applies to the phonetic-context descriptors 703-3-(a,b), which includes the phoneme labels "/k/ /ae/ /t/ /#/ /s/," and 703-4-a, which includes the phoneme labels "/t/ /#/ /s/ /ae/ /t/." The vertical ellipses above the phonetic-context descriptors represents possibly additional phonetic-context descriptors 703-4-(b, . . . ), as well as phonetic-context descriptors for the phoneme labels "/ae/ /t/ /#/," which are omitted from FIG. 7 for the sake of brevity.

Each element of the phonetic-context descriptor 703-1-a, namely the five phoneme labels, the context ("Context$_{1-a}$") and the time duration model ("Timing$_{1-a}$"), are depicted as presenting multiple inputs as represented by multiple vertical arrows. Ellipses between arrows signify possible inputs in addition to the ones explicitly shown. As will be described below, each arrow represents an input value presented to a respective node of the input layer L$_1$ of the neural network 700. (Note that in the illustration in FIG. 7, the one-to-one correspondence of inputs (arrows) to nodes is not evident.)

The output of the neural network 700 is one or more predicted feature vectors 705. In accordance with example embodiments, the number of predicted feature vectors generated for each phonetic-context descriptor input may be determined by the neural network 700, based on the time duration model in the input phonetic-state unit. Each feature vector may contain metrics of acoustic properties that specify how a corresponding frame of waveform data is synthesized by a synthesis engine (e.g., a vocoder of speech synthesizer).

By way of example, the metrics could include Mel Cepstral coefficients, Line Spectral pairs, Linear Predictive coefficients, Mel-Generalized Cepstral Coefficients, fundamental frequency, aperiodic measures, log power spectrum, or phase, together with their first and second order time derivatives. As described above, the feature vectors may be input into a speech synthesizer (e.g., signal generation module 508 in FIG. 5), which may then translate it into a sequential waveform frames.

Figure 8:
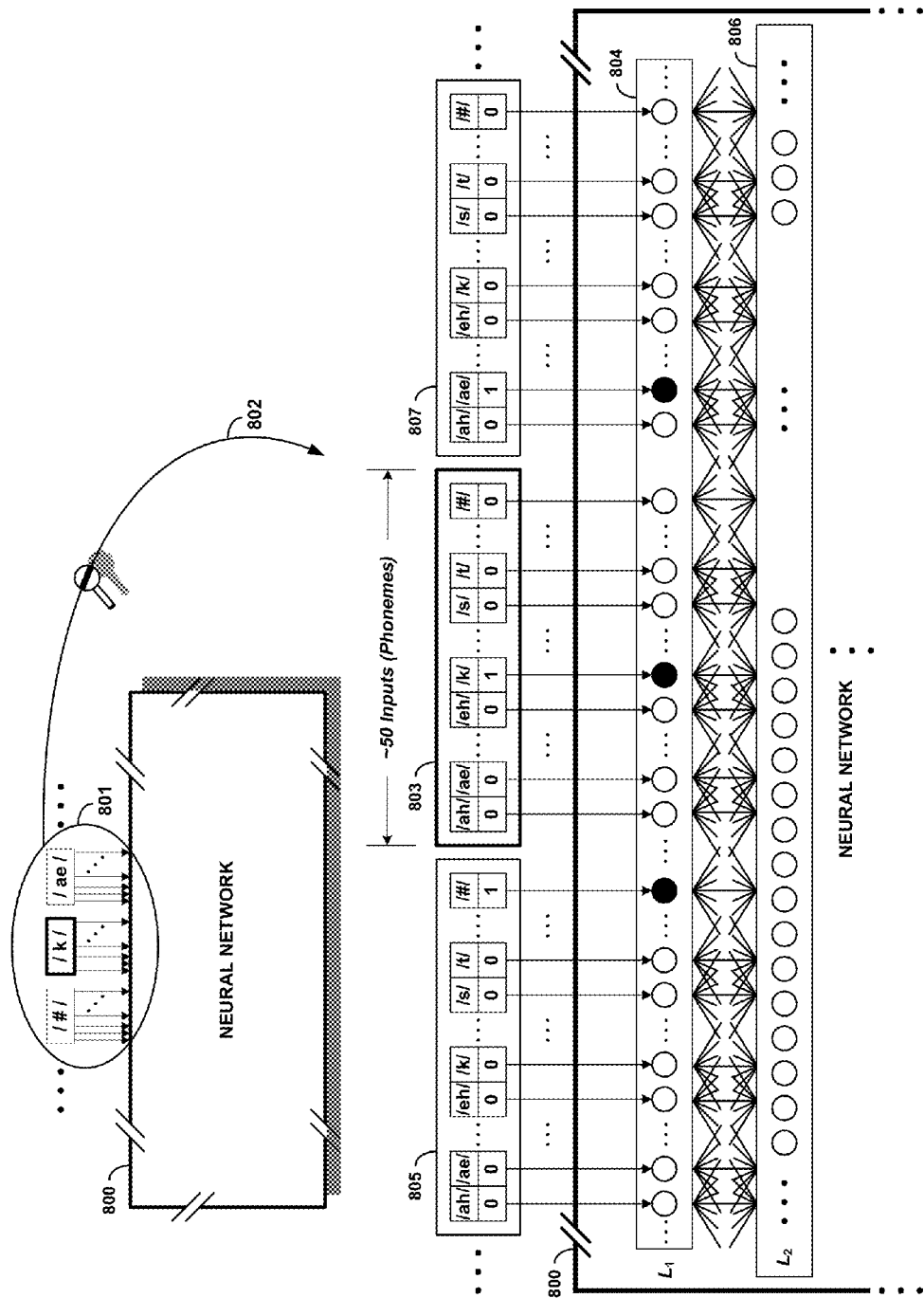
FIG. 8 shows certain aspects of the schematic illustration of FIG. 7 in greater detail.

In accordance with example embodiments, the data contained in each phonetic-context descriptor may be rendered in a binary form, such that the data may be presented and input to then neural network input layer in parallel as a series of binary digits. This is illustrated in FIG. 8, which exemplifies such an input arrangement in more detail. In a top portion of FIG. 8, a section of the input phonetic-context descriptor 703-1-a is reproduced. Specifically, the phoneme label "/k/" together with a left-context label "/#/" and a right-context label "/ae/" are shown; horizontal ellipse to the right and left represent the other elements of the phonetic-context descriptor 703-1-a. A neural network 800 is also shown, but represented by an abbreviated rectangle (where hatch marks along the sides signify the abbreviation). An oval 801 encloses the section of the input phonetic-context descriptor 703-1-a to call it out for closer examination, and a curved arrow 802 points from the oval 801 to a lower portion of FIG. 8, in which more detail of the input configuration is shown.

In the lower portion of FIG. 8, each of the three phoneme labels of the upper portion of the figure is seen to include all of the possible phoneme labels that make up the phonetic dictionary of the speech synthesis system. Each possible label is presented as a binary value of zero or one, which then drives the corresponding input to the neural network. In this way, n phoneme labels of each phonetic-context descriptor effectively control an n-way input switch. For example, each phoneme label in the upper portion of the figure is shown to correspond to one of three n-way phoneme input switches 803, 805 or 807 to the neural network 800, where n is the number of phoneme labels in the phonetic dictionary. Each phoneme-label input switch contains all the phoneme labels of the phoneme dictionary, which in the current example is taken to be approximately 50 (i.e., n≈50). It will be appreciated that phonetic dictionaries with different number of phonemes could be used. By way of example, the phoneme labels of each of the n-way phoneme-label input switches 803, 805 or 807 are "/ah/," "/ae/," . . . , "/eh/," "/k/," . . . , "/s/," "/t/," . . . , and "/#/." The horizontal ellipses in the figure (and the list above) represent phonemes of the dictionary that are not explicitly shown.

Associated with each phoneme label in each n-way phoneme input switch is a binary-number switch connected with one of the input nodes of the neural network 800. The value of the binary-number switch (one or zero) determines whether or not the associated phoneme label is input to the neural network by the n-way phoneme-label input switch. In the example illustrated, a value of one indicates an active input (phoneme label present), while a value of zero indicates no input from the associated phoneme label.

As an example, the phoneme label "/k/" in the upper portions seen to correspond the n-way phoneme-label input switch 803. The binary-number switch associated with phoneme label "/k/" in the n-way phoneme input switch 803 is set to one; all the other binary-number switches in the n-way phoneme-label input switch 803 are set to zero. Accordingly, only the "/k/" input to the neural network from the n-way phoneme-label input switch 803 is active. The input node connected to the binary-number switch associated with phoneme label "/k/" in the n-way phoneme-label input switch 803 is shown in black to indicate the active input; all the other input nodes connected to the n-way phoneme-label input switch 803 are shown in white to indicate no input from the associated phoneme labels.

A similar description applies to the n-way phoneme-label input switches 805 and 807. Specifically, the binary-number switch associated with phoneme label "/#/" in the n-way phoneme-label input switch 805 is set to one; all the other binary-number switches in the n-way phoneme-label input switch 805 are set to zero. Accordingly, only the "/#/" input to the neural network from the n-way phoneme-label input switch 805 is active; the other phoneme labels of the n-way phoneme-label input switch 805 supply no input to the neural network. Similarly, the binary-number switch associated with phoneme label "/ae/" in the n-way phoneme-label input switch 807 is set to one; all the other binary-number switches in the n-way phoneme-label input switch 807 are set to zero. Accordingly, only the "/ae/" input to the neural network from the n-way phoneme-label input switch 807 is active; the other phoneme labels of the n-way phoneme-label input switch 807 supply no input to the neural network. The input nodes connected to the binary-number switch associated with phoneme label "/#/" in the n-way phoneme input switch 805 and with phoneme "/#/" in the n-way phoneme-label input switch 805 are shown in black to indicate the active input. The white circles again represent inactive input nodes. Input from other n-way phoneme-label input switches not shown as well as from the context information and duration model may us a similar scheme of binary-number switches connected to input nodes of the neural network 800.

Although not explicitly shown in FIG. 8, input from the other context and timing information, such as that represented in the "Context" and "Timing" elements of FIG. 7, may also be rendered or converted to binary form for input to the neural network. For example, binary switches could be used to indicate whether or not an identified phoneme is a vowel, a consonant, and so on. Other context information could similarly be encoded in binary form. Additionally or alternatively, some or all of the context and/or timing data could be represented in integer and/or real-number (e.g., floating-point representation) form, and presented as input to the neural network in that form. For example, time duration could be represented as an integer value of number of milliseconds or other discrete time units.

In the example illustrated in FIG. 8, the input nodes are part of the $L_1$ input layer 804 of the neural network 800. For the sake of brevity in the figure, only on additional layer $L_2$, corresponding to the hidden layer 806 is shown. A web of intersecting lines between the $L_1$ and $L_2$ layers is meant to represent a fully-connected mesh between the nodes of the respective layers. Horizontal ellipses between nodes are meant to represent additional nodes not explicitly shown in FIG. 8. It will be appreciated that other neural network architectures could be used.

Once the neural network 800 completes mapping a given input phonetic-context descriptor to one or more predicted feature vectors (frames), the next phonetic-context descriptor in the input sequence is input to the neural network and processed. Referring again to FIG. 7, the phonetic-context descriptor 703-2-$a$ would be input and processed upon completion of processing of the phonetic-context descriptor 703-1-$(a,b,c)$, and so on.

The examples illustrated in FIGS. 7 and 8 apply both to training and run-time operation of the neural network. As discussed above, training the neural network with a large and varied body of sample text and corresponding speech allows it to process a similarly large range of input during run-time. By using a neural network to implement the parameter generating function of a speech synthesis system (such as system 500 in FIG. 5), the large number of contexts associated with phoneme labels of the phonetic dictionary becomes an asset to the effectiveness with which the neural network may be trained, and thereby obviates the need to introduce approximation measures, such as clustering of contexts, tree searches, or statistical modeling, for example. A result can be a robust and versatile speech synthesis system.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:
1. A method comprising:
training a neural network implemented by one or more processors of a system to map one or more training-time sequences of phonetic-context descriptors received by the neural network into training-time predicted feature vectors that correspond to acoustic properties of predefined speech waveforms, wherein the one or more training-time sequences of phonetic-context descriptors correspond to phonetic transcriptions of training-time text strings, and the training-time text strings correspond to written transcriptions of speech carried in the predefined speech waveforms;
receiving, by a text analysis module implemented by the one or more processors, a run-time text string;
processing the received run-time text string with the text analysis module to generate a run-time sequence of phonetic-context descriptors that corresponds to a phonetic transcription of the run-time text string, wherein each phonetic-context descriptor of the run-time sequence includes a respective label identifying a phonetic speech unit of a plurality of phonetic speech units, data indicating phonetic context of the identified phonetic speech unit, and data indicating time duration of the identified phonetic speech unit;
processing the run-time sequence of the phonetic-context descriptors with the trained neural network in a corresponding sequence of neural network time steps to generate one or more run-time predicted feature vectors; and
processing the one or more run-time predicted feature vectors with a signal generation module to produce and output a run-time speech waveform corresponding to a spoken rendering of the received run-time text string,
wherein processing the received run-time text string with the text analysis module to generate the run-time sequence of phonetic-context descriptors comprises:
generating a run-time transcription sequence of phonetic speech units that corresponds to the phonetic transcription of the run-time text string; and
determining a respective number of consecutive phonetic-context descriptors to generate for each of the phonetic speech units of the run-time transcription sequence.
2. The method of claim 1, wherein the neural network and the text analysis module are implemented by at least one common processor from among the one or more processors of the system.

3. The method of claim 1, wherein the training-time text strings and the predefined waveforms are part of a corpus of speech data, wherein the phonetic transcriptions of the training-time text strings are constructed from one or more labels each identifying a respective phonetic speech unit of the plurality of phonetic speech units, wherein each phonetic-context descriptor of the one or more training-time sequences includes one of the one or more labels, data indicating phonetic context of the identified respective phonetic speech unit, and data indicating time duration of the identified respective phonetic speech unit, wherein all of the phonetic-context descriptors of the one or more training-time sequences collectively comprise at least a portion of all possible combinations of phonetic contexts of each of the phonetic speech units of the plurality, and wherein training the neural network to map the one or more training-time sequences of phonetic-context descriptors into the training-time predicted feature vectors comprises:

training the neural network to process at least the portion of all possible combinations of phonetic contexts of each of the phonetic speech units of the plurality; and training the neural network to generate the training-time predicted feature vectors based at least in part on processing the phonetic context data in the phonetic-context descriptors of the one or more training-time sequences.

4. The method of claim 3, wherein processing the run-time sequence of the phonetic-context descriptors with the trained neural network in the corresponding sequence of neural network time steps to generate the one or more run-time predicted feature vectors comprises:

receiving respective labels and phonetic context data in the phonetic-context descriptors of the run-time sequence; and generating the run-time predicted feature vectors based at least in part on the received respective labels and phonetic context data in the phonetic-context descriptors of the run-time sequence.

5. The method of claim 1, wherein outputting the run-time speech waveform comprises an action, the action being at least one of playing an audio rendering of the run-time speech waveform on an audio output device, or recording the run-time speech waveform as audio data on an audio recording medium.

6. The method of claim 1, wherein the identified phonetic speech unit is a phoneme, and the plurality of phonetic speech units is a corresponding plurality of phonemes, and wherein the data indicating the phonetic context of the identified phonetic speech unit comprises at least one label identifying a temporally-prior phoneme of the plurality of phonemes, and at least one label identifying a temporally-subsequent phoneme of the plurality of phonemes.

7. The method of claim 6, wherein the data indicating the phonetic context of the identified phonetic speech unit further comprises data indicating a classifying characteristic of the identified phoneme, the classifying characteristic being at least one of nasal, fricative, vowel, linguistic context, or part of speech.

8. The method of claim 1, wherein each of the one or more run-time predicted feature vectors corresponds to a respective temporal frame of acoustic data in the run-time speech waveform, and wherein the data indicating time duration of the identified phonetic speech unit comprises a number that specifies how many consecutive temporal frames of acoustic data over which an acoustic rendering of the identified phonetic speech unit in the run-time speech waveform should last.

9. The method of claim 1, wherein each of the one or more run-time predicted feature vectors includes a set of acoustic metrics, and wherein the set of acoustic metrics is at least one of Mel Cepstral coefficients, Line Spectral Pairs, Linear Predictive coefficients, Mel-Generalized Cepstral Coefficients, fundamental frequency, aperiodic measures, log power spectrum, or phase.

10. The method of claim 9, wherein each of the one or more run-time predicted feature vectors further includes a set of first-order time derivatives of the set of acoustic metrics, and a set of second-order time derivatives of the set of acoustic metrics, the second-order time derivatives being time derivatives of the first-order time derivatives.

11. A system comprising:
one or more processors;
memory; and
machine-readable instructions stored in the memory, that upon execution by the one or more processors cause the system to carry out operations comprising:

training a neural network implemented by the system to map one or more training-time sequences of phonetic-context descriptors received by the neural network into training-time predicted feature vectors that correspond to acoustic properties of predefined speech waveforms, wherein the one or more training-time sequences of phonetic-context descriptors correspond to phonetic transcriptions of training-time text strings, and the training-time text strings correspond to written transcriptions of speech carried in the predefined speech waveforms, receiving, by a text analysis module implemented by the system, a run-time text string, processing the received run-time text string with the text analysis module to generate a run-time sequence of phonetic-context descriptors that corresponds to a phonetic transcription of the run-time text string, wherein each phonetic-context descriptor of the run-time sequence includes a respective label identifying a phonetic speech unit of a plurality of phonetic speech units, data indicating phonetic context of the identified phonetic speech unit, and data indicating time duration of the identified phonetic speech unit, processing the run-time sequence of the phonetic-context descriptors with the trained neural network in a corresponding sequence of neural network time steps to generate one or more run-time predicted feature vectors, and processing the one or more run-time predicted feature vectors with a signal generation module to produce and output a run-time speech waveform corresponding to a spoken rendering of the received run-time text string, wherein processing the received run-time text string with the text analysis module to generate the run-time sequence of phonetic-context descriptors comprises:

generating a run-time transcription sequence of phonetic speech units that corresponds to the phonetic transcription of the run-time text string; and determining a respective number of consecutive phonetic-context descriptors to generate for each of the phonetic speech units of the run-time transcription sequence.

12. The system of claim 11, wherein the training-time text strings and the predefined waveforms are part of a corpus of speech data, wherein the phonetic transcriptions of the training-time text strings are constructed from one or more labels each identifying a respective phonetic speech unit of the plurality of phonetic speech units, wherein each phonetic-context descriptor of the one or more training-time sequences includes one of the one or more labels, data indicating phonetic context of the identified respective phonetic speech unit, and data indicating time duration of the identified respective phonetic speech unit, wherein all of the phonetic-context descriptors of the one or more training-time sequences collectively comprise at least a portion of all possible combinations of phonetic contexts of each of the phonetic speech units of the plurality, and wherein training the neural network to map the one or more training-time sequences of phonetic-context descriptors into the training-time predicted feature vectors comprises:

training the neural network to process at least the portion of all possible combinations of phonetic contexts of each of the phonetic speech units of the plurality; and training the neural network to generate the training-time predicted feature vectors based at least in part on processing the phonetic context data in the phonetic-context descriptors of the one or more training-time sequences.

13. The system of claim 12, wherein processing the run-time sequence of the phonetic-context descriptors with the trained neural network in the corresponding sequence of neural network time steps to generate the one or more run-time predicted feature vectors comprises:

receiving respective labels and phonetic context data in the phonetic-context descriptors of the run-time sequence; and generating the run-time predicted feature vectors based at least in part on the received respective labels and phonetic context data in the phonetic-context descriptors of the run-time sequence.

14. The system of claim 11, wherein outputting the run-time speech waveform comprises an action, the action being at least one of playing an audio rendering of the run-time speech waveform on an audio output device, or recording the run-time speech waveform as audio data on an audio recording medium.

15. The system of claim 11, wherein the identified phonetic speech unit is a phoneme, and the plurality of phonetic speech units is a corresponding plurality of phonemes, and wherein the data indicating the phonetic context of the identified phonetic speech unit comprises at least one label identifying a temporally-prior phoneme of the plurality of phonemes, and at least one label identifying a temporally-subsequent phoneme of the plurality of phonemes.

16. The system of claim 15, wherein the data indicating the phonetic context of the identified phonetic speech unit further comprises data indicating a classifying characteristic of the identified phoneme, the classifying characteristic being at least one of nasal, fricative, vowel, linguistic context, or part of speech.

17. The system of claim 11, wherein each of the one or more run-time predicted feature vectors corresponds to a respective temporal frame of acoustic data in the run-time speech waveform, and wherein the data indicating time duration of the identified phonetic speech unit comprises a number that specifies how many consecutive temporal frames of acoustic data over which an acoustic rendering of the identified phonetic speech unit in the run-time speech waveform should last.

18. The system of claim 11, wherein each of the one or more run-time predicted feature vectors includes a set of acoustic metrics, and wherein the set of acoustic metrics is at least one of Mel Cepstral coefficients, Line Spectral Pairs, Linear Predictive coefficients, Mel-Generalized Cepstral Coefficients, fundamental frequency, aperiodic measures, log power spectrum, or phase, and wherein each of the one or more run-time predicted feature vectors further includes a set of first-order time derivatives of the set of acoustic metrics, and a set of second-order time derivatives of the set of acoustic metrics, the second-order time derivatives being time derivatives of the first-order time derivatives.

19. An article of manufacture including a computer-readable storage medium, having stored thereon program instructions that, upon execution by one or more processors of a system, cause the system to perform operations comprising:

training a neural network implemented by the system to map one or more training-time sequences of phonetic-context descriptors received by the neural network into training-time predicted feature vectors that correspond to acoustic properties of predefined speech waveforms, wherein the one or more training-time sequences of phonetic-context descriptors correspond to phonetic transcriptions of training-time text strings, and the training-time text strings correspond to written transcriptions of speech carried in the predefined speech waveforms;

receiving, by a text analysis module implemented by the system, a run-time text string;

processing the received run-time text string with the text analysis module to generate a run-time sequence of phonetic-context descriptors that corresponds to a phonetic transcription of the run-time text string, wherein each phonetic-context descriptor of the run-time sequence includes a respective label identifying a phonetic speech unit of a plurality of phonetic speech units, data indicating phonetic context of the identified phonetic speech unit, and data indicating time duration of the identified phonetic speech unit;

processing the run-time sequence of the phonetic-context descriptors with the trained neural network in a corresponding sequence of neural network time steps to generate one or more run-time predicted feature vectors; and processing the one or more run-time predicted feature vectors with a signal generation module to produce and output a run-time speech waveform corresponding to a spoken rendering of the received run-time text string;

wherein processing the received run-time text string with the text analysis module to generate the run-time sequence of phonetic-context descriptors comprises:

generating a run-time transcription sequence of phonetic speech units that corresponds to the phonetic transcription of the run-time text string; and determining a respective number of consecutive phonetic-context descriptors to generate for each of the phonetic speech units of the run-time transcription sequence.

20. The article of manufacture of claim 19, wherein the training-time text strings and the predefined waveforms are part of a corpus of speech data, wherein the phonetic transcriptions of the training-time text strings are constructed from one or more labels each identifying a respective phonetic speech unit of the plurality of phonetic speech units, wherein each phonetic-context descriptor of the one or more training-time sequences includes one of the one or more labels, data indicating phonetic context of the identified respective phonetic speech unit, and data indicating time duration of the identified respective phonetic speech unit, wherein all of the phonetic-context descriptors of the one or more training-time sequences collectively comprise at least a portion of all possible combinations of phonetic contexts of each of the phonetic speech units of the plurality, and wherein training the neural network to map the one or more training-time sequences of phonetic-context descriptors into the training-time predicted feature vectors comprises:

training the neural network to process at least the portion of all possible combinations of phonetic contexts of each of the phonetic speech units of the plurality; and training the neural network to generate the training-time predicted feature vectors based at least in part on processing the phonetic context data in the phonetic-context descriptors of the one or more training-time sequences.

21. The article of manufacture of claim 20, wherein processing the run-time sequence of the phonetic-context descriptors with the trained neural network in the corresponding sequence of neural network time steps to generate the one or more run-time predicted feature vectors comprises:

receiving respective labels and phonetic context data in the phonetic-context descriptors of the run-time sequence; and generating the run-time predicted feature vectors based at least in part on the received respective labels and phonetic context data in the phonetic-context descriptors of the run-time sequence.

22. The article of manufacture of claim 19, wherein outputting the run-time speech waveform comprises an action, the action being at least one of playing an audio rendering of the run-time speech waveform on an audio output device, or recording the run-time speech waveform as audio data on an audio recording medium.

23. The article of manufacture of claim 19, wherein the identified phonetic speech unit is a phoneme, and the plurality of phonetic speech units is a corresponding plurality of phonemes, and wherein the data indicating the phonetic context of the identified phonetic speech unit comprises at least one label identifying a temporally-prior phoneme of the plurality of phonemes, and at least one label identifying a temporally-subsequent phoneme of the plurality of phonemes.

24. The article of manufacture of claim 23, wherein the data indicating the phonetic context of the identified phonetic speech unit further comprises data indicating a classifying characteristic of the identified phoneme, the classifying characteristic being at least one of nasal, fricative, vowel, linguistic context, or part of speech.

25. The article of manufacture of claim 23, each of the one or more run-time predicted feature vectors corresponds to a respective temporal frame of acoustic data in the run-time speech waveform, and wherein the data indicating time duration of the identified phonetic speech unit comprises a number that specifies how many consecutive temporal frames of acoustic data over which an acoustic rendering of the identified phonetic speech unit in the run-time speech waveform should last.

26. The article of manufacture of claim 19, wherein each of the one or more run-time predicted feature vectors includes a set of acoustic metrics, and wherein the set of acoustic metrics is at least one of Mel Cepstral coefficients, Line Spectral Pairs, Linear Predictive coefficients, Mel-Generalized Cepstral Coefficients, fundamental frequency, aperiodic measures, log power spectrum, or phase, and wherein each of the one or more run-time predicted feature vectors further includes a set of first-order time derivatives of the set of acoustic metrics, and a set of second-order time derivatives of the set of acoustic metrics, the second-order time derivatives being time derivatives of the first-order time derivatives.

* * * * *